US012660017B2

(12) United States Patent
    Xu et al.

(10) Patent No.:    US 12,660,017 B2
(45) Date of Patent:       Jun. 16, 2026

(54) RATE-MATCHING INFORMATION FOR A FORWARD LINK RESOURCE GRANT VIA SIDELINK CONTROL INFORMATION

(71) Applicant: QUALCOMM Incorporated, San Diego, CA (US)

(72) Inventors: Changlong Xu, Beijing (CN); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 692 days.

(21) Appl. No.: 18/000,239

(22) PCT Filed: Jul. 15, 2020

(86) PCT No.: PCT/CN2020/102078
    § 371 (c)(1),
    (2) Date: Nov. 29, 2022

(87) PCT Pub. No.: WO2022/011590
    PCT Pub. Date: Jan. 20, 2022

(65) Prior Publication Data
    US 2023/0247694 A1      Aug. 3, 2023

(51) Int. Cl.
    *H04W 76/14*        (2018.01)
    *H04L 1/00*         (2006.01)
(52) U.S. Cl.
    CPC ........... *H04W 76/14* (2018.02); *H04L 1/0067* (2013.01)
(58) Field of Classification Search
    CPC ... H04L 1/0025; H04L 1/1664; H04L 1/1822; H04L 1/1861; H04L 1/1896;
    (Continued)

(56) References Cited

U.S. PATENT DOCUMENTS

2015/0049694 A1     2/2015   Choi et al.
2019/0182859 A1*    6/2019   Khoryaev ............. H04W 52/42
                            (Continued)

FOREIGN PATENT DOCUMENTS

CN        107371255 A      11/2017
CN        111083741 A       4/2020
WO    WO-2017222277 A1     12/2017

OTHER PUBLICATIONS

International Search Report and Written Opinion—PCT/CN2020/102078—ISA/EPO—Apr. 19, 2021 (206257WO1).

*Primary Examiner* — Awet Haile
(74) *Attorney, Agent, or Firm* — Holland & Hart LLP /Qualcomm

(57)            ABSTRACT

Methods, systems, and devices for wireless communications are described. In some sidelink communications systems, an anchor user equipment (UE) may allocate a set of subchannels to a client UE for a forward link transmission from the anchor UE to the client UE. The anchor UE may use a control region of one or more subchannels of the set of subchannels allocated to the client UE for one or more control-only transmissions. The anchor UE may transmit a rate-matching indication field to the client UE to indicate a rate-matching status of the set of subchannels that are allocated to the client UE, which may indicate on which subchannels the client UE may rate-match around a control region of the subchannel to receive the forward link transmission.

35 Claims, 21 Drawing Sheets

(58) Field of Classification Search
CPC ... H04L 5/0044; H04L 5/0053; H04L 5/0055;
H04L 1/0067; H04W 72/20; H04W
72/53; H04W 72/543; H04W 76/14
See application file for complete search history.

(56) References Cited

U.S. PATENT DOCUMENTS

| | | | | |
|---|---|---|---|---|
| 2020/0045674 A1* | 2/2020 | Tseng | .................... | H04W 76/14 |
| 2022/0053496 A1* | 2/2022 | Yu | ......................... | H04L 5/0055 |
| 2022/0167367 A1* | 5/2022 | Tidestav | ............... | H04L 5/0048 |
| 2022/0399917 A1* | 12/2022 | Shin | ....................... | H04B 7/088 |
| 2023/0254842 A1* | 8/2023 | Zhou | .................... | H04W 72/02 |
| | | | | 370/329 |

* cited by examiner

Rate-Matching Indication Field 315

OFDM Symbol 310

SCI-1 325

Subchannel 305-a

SCI-1 330

Subchannel 305-b

Frequency

Time

Control Region 320

Slot 365

300

Rate-Matching Indication Field 415          OFDM Symbol 410

SCI-1 425

Subchannel 405-a

SCI-1 430

Subchannel 405-b

Frequency

Time

Control Region 420          Slot 465

400

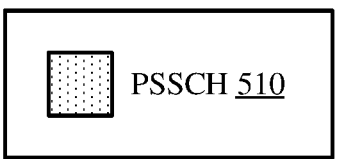
PSCCH 515
Subchannel 505-a
Subchannel 505-b
Subchannel 505-c
Subchannel 505-d
Subchannel 505-e
Uplink Grant 520-a    Subchannel 505-f
Uplink Grant 520-b    Subchannel 505-g
Uplink Grant 520-c    Subchannel 505-h
Uplink Grant 520-d    Subchannel 505-i
500
FIG. 5

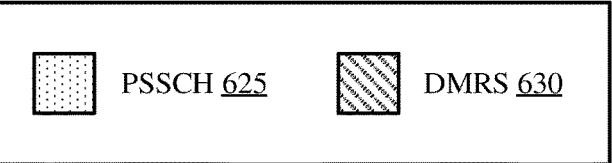
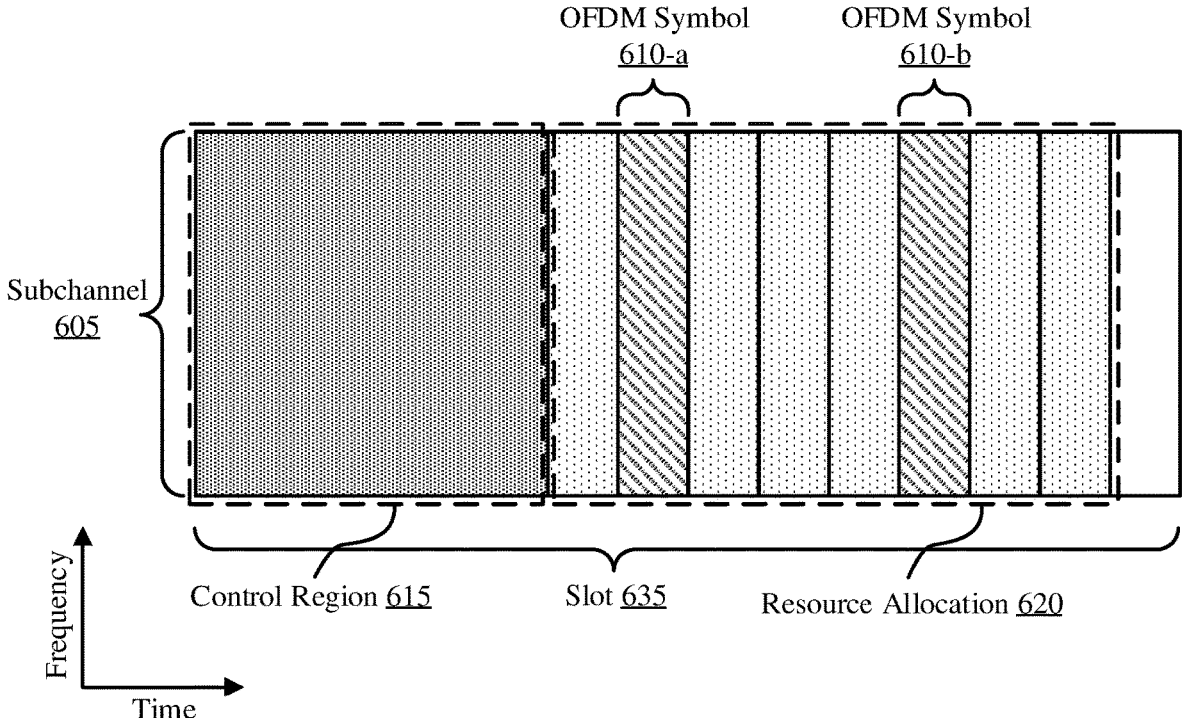
FIG. 6

115-d 115-e 705-a — Establish a connection with a second UE including a forward link and a reverse link Establish a connection with a first UE including a forward link and a reverse link — 705-b 710 — Determine a forward link resource grant for the second UE 715 — Determine a value for each bit included in a rate-matching indication field 720 — Rate-Matching Indication Field 725-a — Determine a first location for a first DMRS and a second location for a second DMRS Determine a first location for a first DMRS and a second location for a second DMRS — 725-b 730 — Forward Link Transmission Decode the forward link transmission based on the rate-matching status — 735

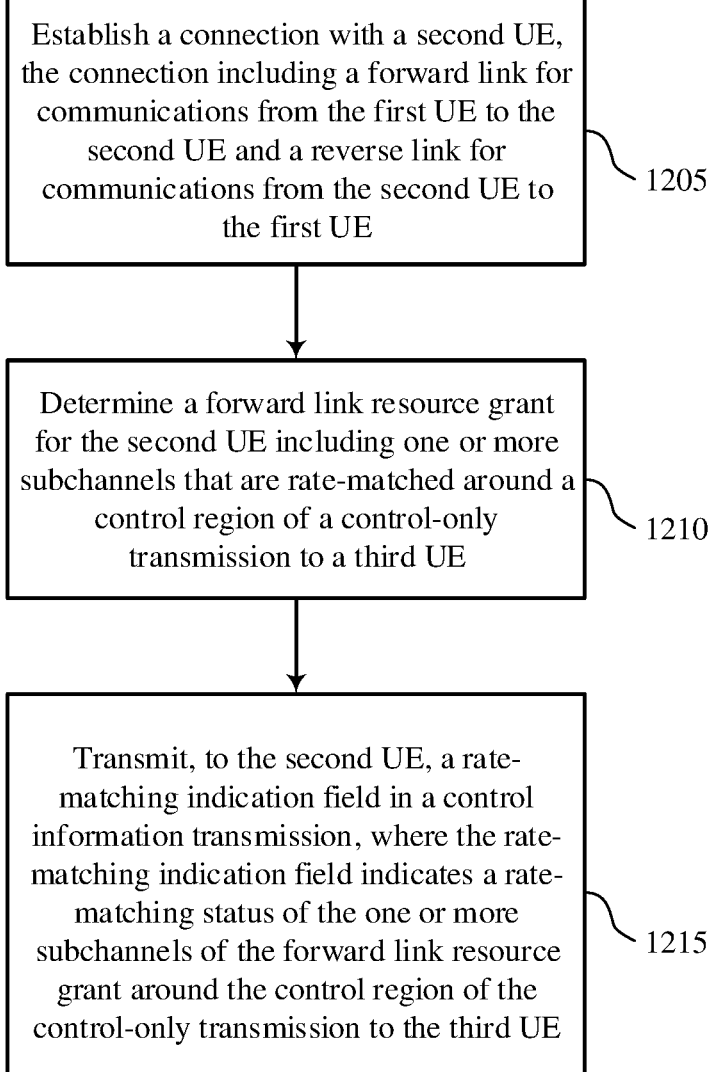

Establish a connection with a second UE, the connection including a forward link for communications from the first UE to the second UE and a reverse link for communications from the second UE to the first UE

1205

Determine a forward link resource grant for the second UE including one or more subchannels that are rate-matched around a control region of a control-only transmission to a third UE

1210

Transmit, to the second UE, a rate-matching indication field in a control information transmission, where the rate-matching indication field indicates a rate-matching status of the one or more subchannels of the forward link resource grant around the control region of the control-only transmission to the third UE

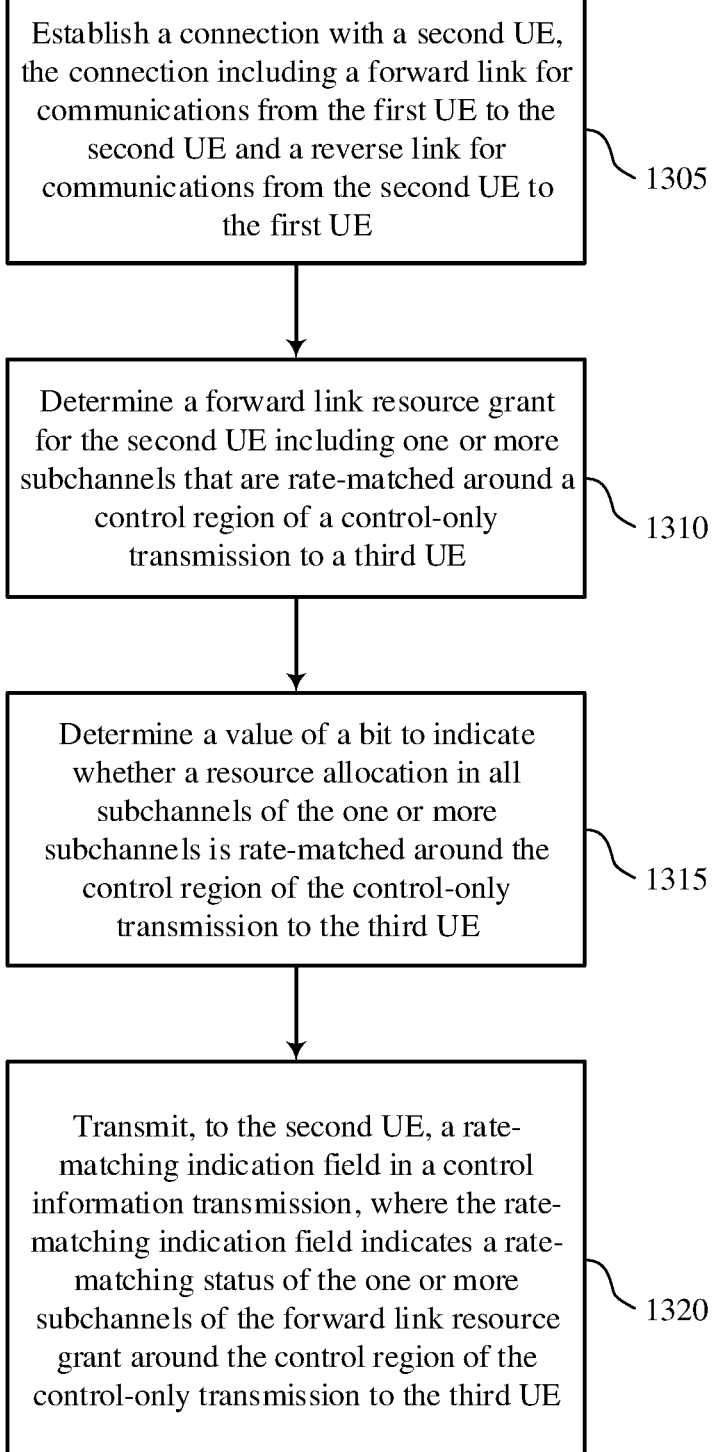

Establish a connection with a second UE, the connection including a forward link for communications from the first UE to the second UE and a reverse link for communications from the second UE to the first UE

1305

Determine a forward link resource grant for the second UE including one or more subchannels that are rate-matched around a control region of a control-only transmission to a third UE

1310

Determine a value of a bit to indicate whether a resource allocation in all subchannels of the one or more subchannels is rate-matched around the control region of the control-only transmission to the third UE

1315

Transmit, to the second UE, a rate-matching indication field in a control information transmission, where the rate-matching indication field indicates a rate-matching status of the one or more subchannels of the forward link resource grant around the control region of the control-only transmission to the third UE

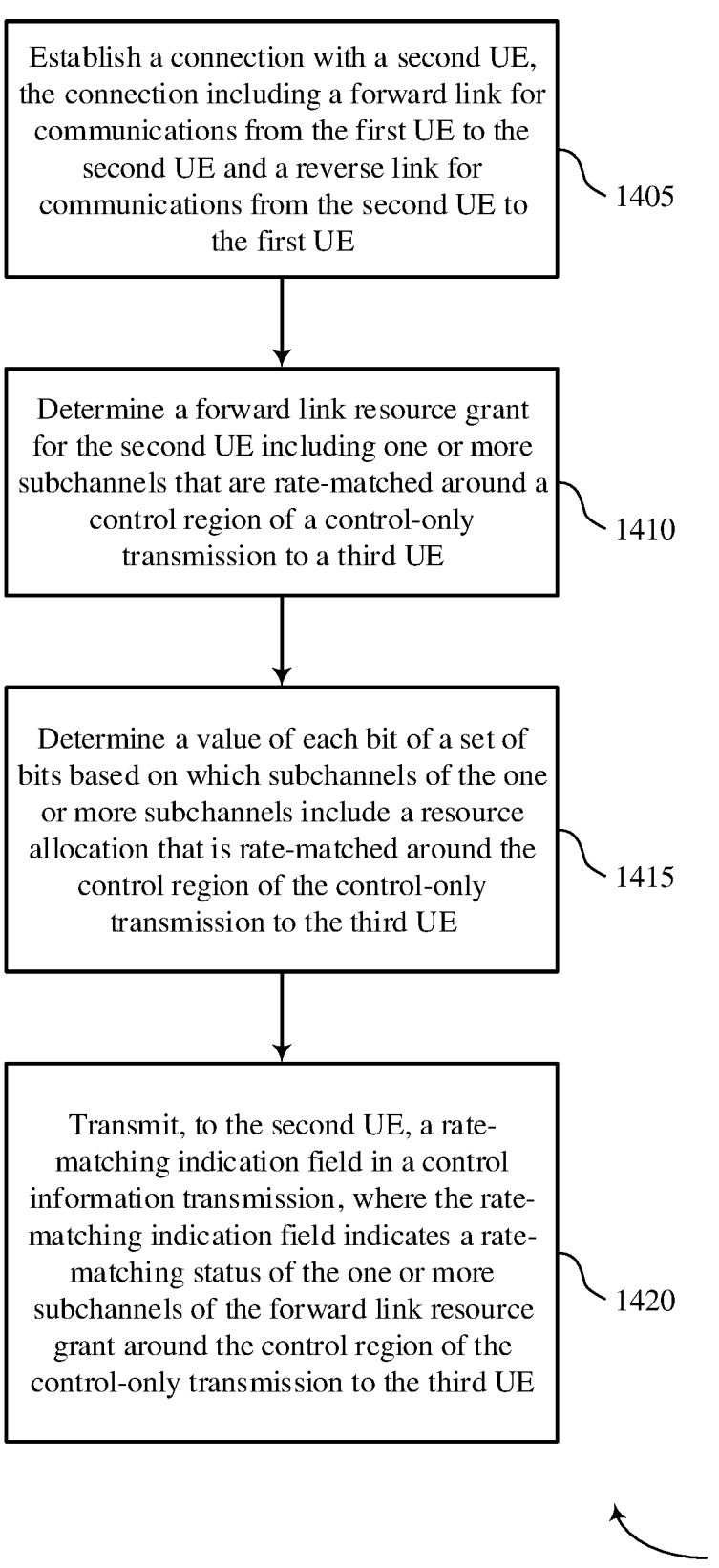

Establish a connection with a second UE, the connection including a forward link for communications from the first UE to the second UE and a reverse link for communications from the second UE to the first UE

1405

Determine a forward link resource grant for the second UE including one or more subchannels that are rate-matched around a control region of a control-only transmission to a third UE

1410

Determine a value of each bit of a set of bits based on which subchannels of the one or more subchannels include a resource allocation that is rate-matched around the control region of the control-only transmission to the third UE

1415

Transmit, to the second UE, a rate-matching indication field in a control information transmission, where the rate-matching indication field indicates a rate-matching status of the one or more subchannels of the forward link resource grant around the control region of the control-only transmission to the third UE

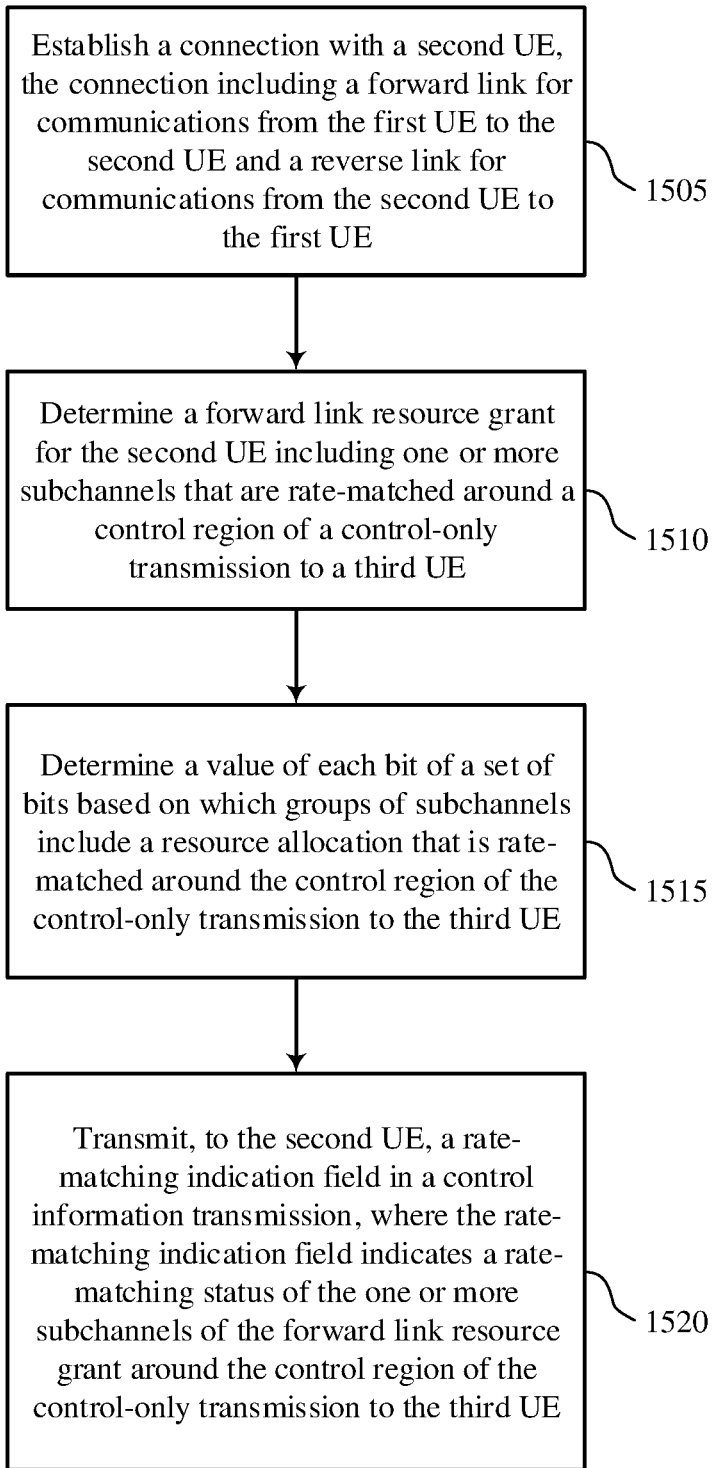

Establish a connection with a second UE, the connection including a forward link for communications from the first UE to the second UE and a reverse link for communications from the second UE to the first UE

1505

Determine a forward link resource grant for the second UE including one or more subchannels that are rate-matched around a control region of a control-only transmission to a third UE

1510

Determine a value of each bit of a set of bits based on which groups of subchannels include a resource allocation that is rate-matched around the control region of the control-only transmission to the third UE

1515

Transmit, to the second UE, a rate-matching indication field in a control information transmission, where the rate-matching indication field indicates a rate-matching status of the one or more subchannels of the forward link resource grant around the control region of the control-only transmission to the third UE

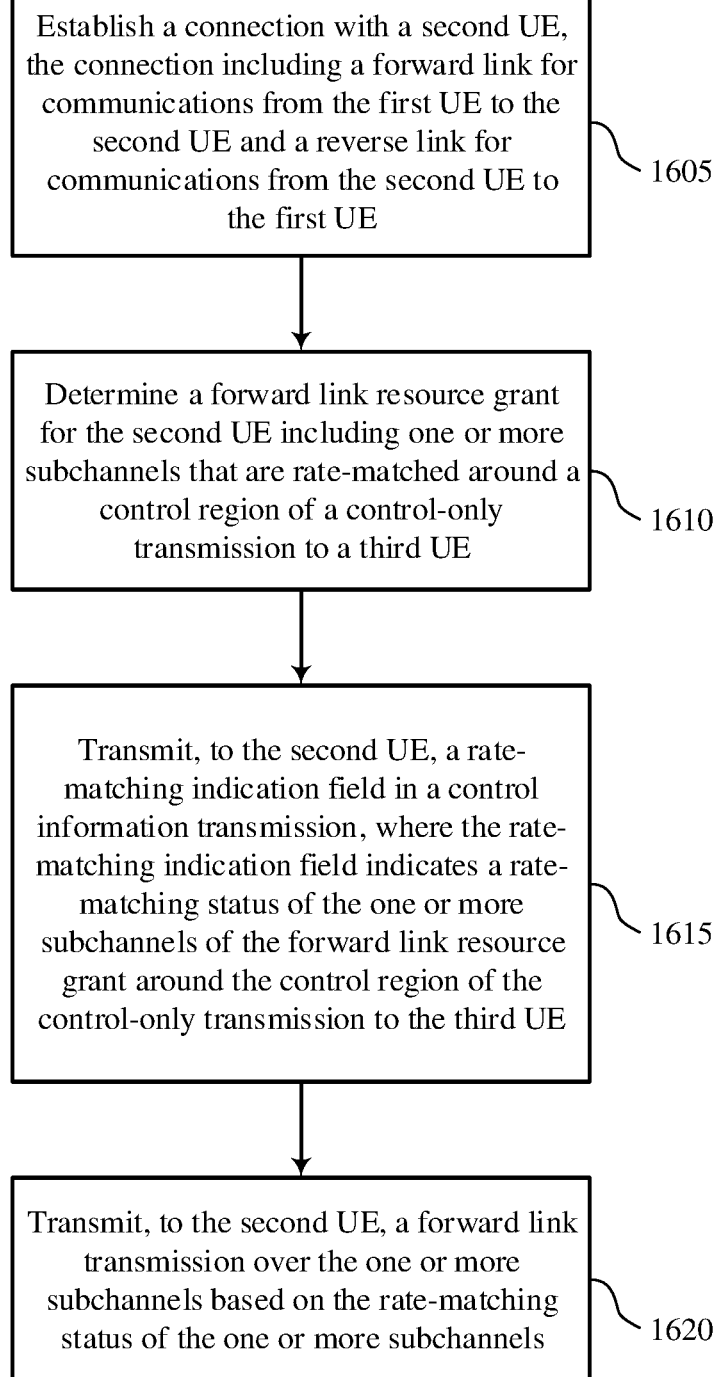

Establish a connection with a second UE, the connection including a forward link for communications from the first UE to the second UE and a reverse link for communications from the second UE to the first UE

1605

Determine a forward link resource grant for the second UE including one or more subchannels that are rate-matched around a control region of a control-only transmission to a third UE

1610

Transmit, to the second UE, a rate-matching indication field in a control information transmission, where the rate-matching indication field indicates a rate-matching status of the one or more subchannels of the forward link resource grant around the control region of the control-only transmission to the third UE

1615

Transmit, to the second UE, a forward link transmission over the one or more subchannels based on the rate-matching status of the one or more subchannels

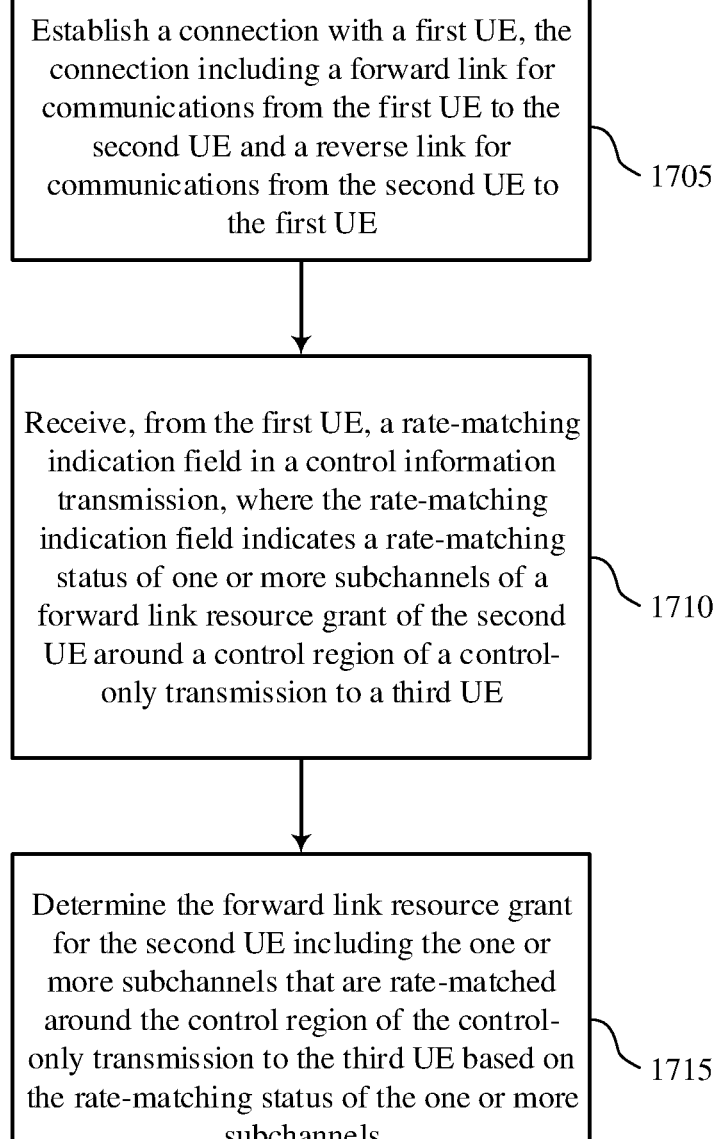

Establish a connection with a first UE, the connection including a forward link for communications from the first UE to the second UE and a reverse link for communications from the second UE to the first UE

1705

Receive, from the first UE, a rate-matching indication field in a control information transmission, where the rate-matching indication field indicates a rate-matching status of one or more subchannels of a forward link resource grant of the second UE around a control region of a control-only transmission to a third UE

1710

Determine the forward link resource grant for the second UE including the one or more subchannels that are rate-matched around the control region of the control-only transmission to the third UE based on the rate-matching status of the one or more subchannels

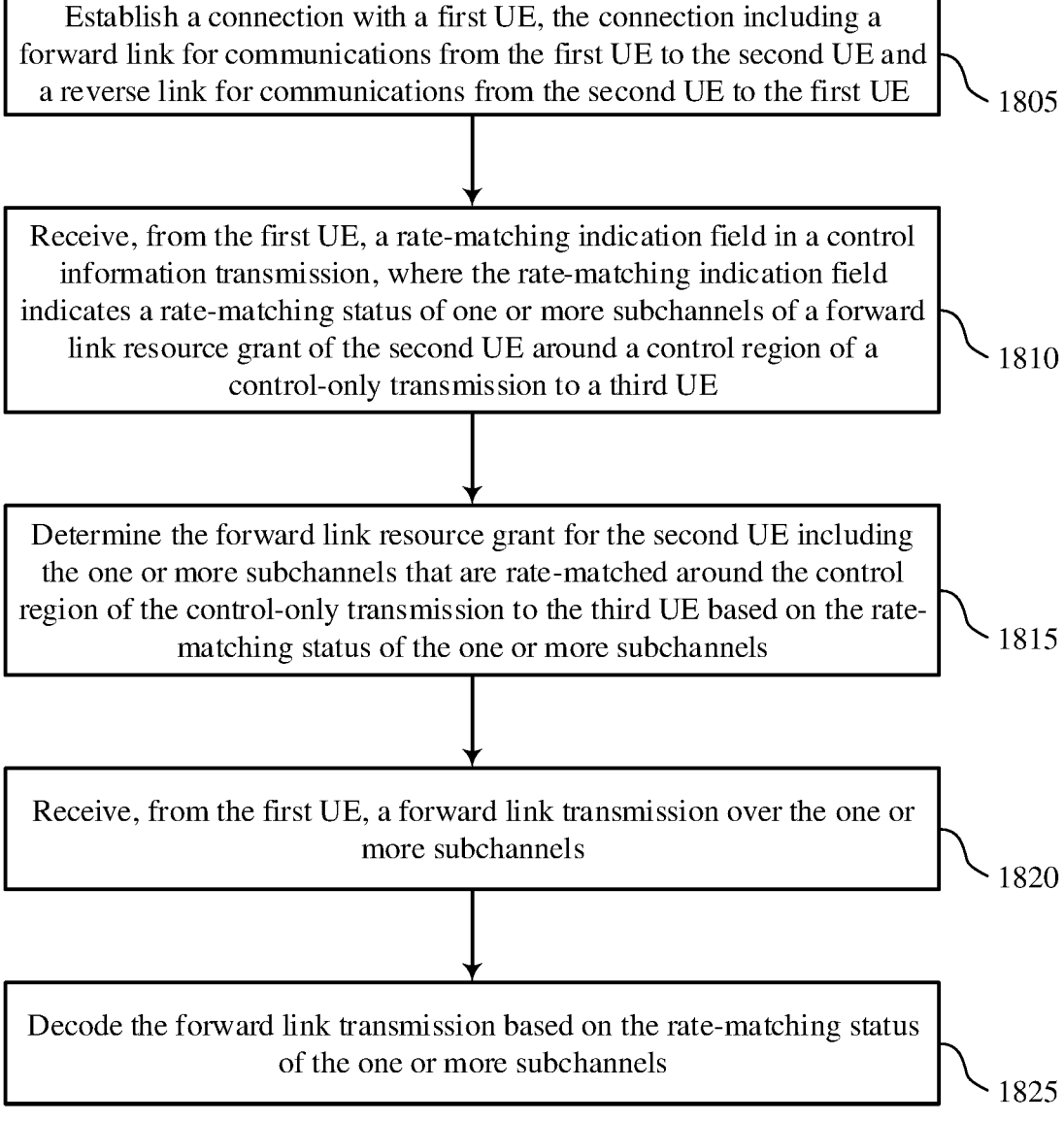

Establish a connection with a first UE, the connection including a forward link for communications from the first UE to the second UE and a reverse link for communications from the second UE to the first UE ⟋ 1805

Receive, from the first UE, a rate-matching indication field in a control information transmission, where the rate-matching indication field indicates a rate-matching status of one or more subchannels of a forward link resource grant of the second UE around a control region of a control-only transmission to a third UE ⟋ 1810

Determine the forward link resource grant for the second UE including the one or more subchannels that are rate-matched around the control region of the control-only transmission to the third UE based on the rate-matching status of the one or more subchannels ⟋ 1815

Receive, from the first UE, a forward link transmission over the one or more subchannels ⟋ 1820

Decode the forward link transmission based on the rate-matching status of the one or more subchannels ⟋ 1825

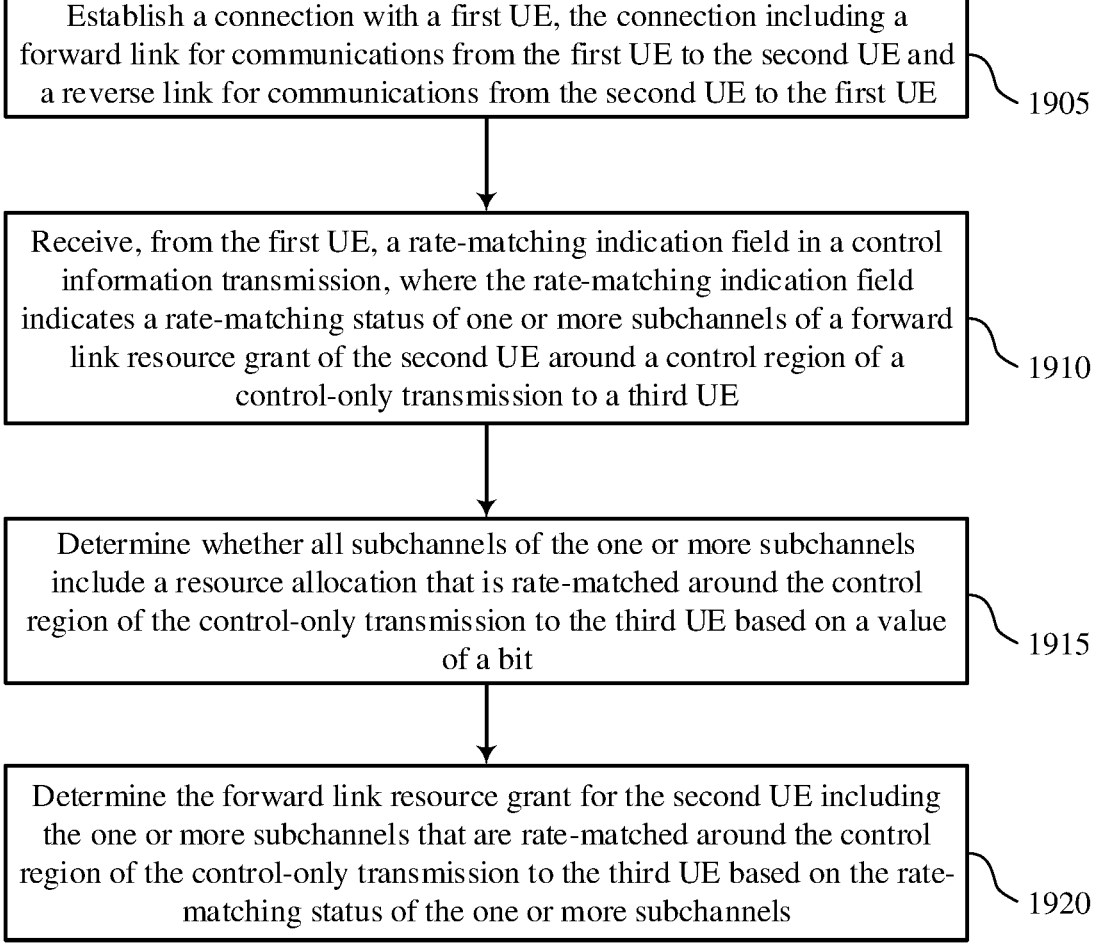

Establish a connection with a first UE, the connection including a forward link for communications from the first UE to the second UE and a reverse link for communications from the second UE to the first UE ⟍ 1905

Receive, from the first UE, a rate-matching indication field in a control information transmission, where the rate-matching indication field indicates a rate-matching status of one or more subchannels of a forward link resource grant of the second UE around a control region of a control-only transmission to a third UE ⟍ 1910

Determine whether all subchannels of the one or more subchannels include a resource allocation that is rate-matched around the control region of the control-only transmission to the third UE based on a value of a bit ⟍ 1915

Determine the forward link resource grant for the second UE including the one or more subchannels that are rate-matched around the control region of the control-only transmission to the third UE based on the rate-matching status of the one or more subchannels ⟍ 1920

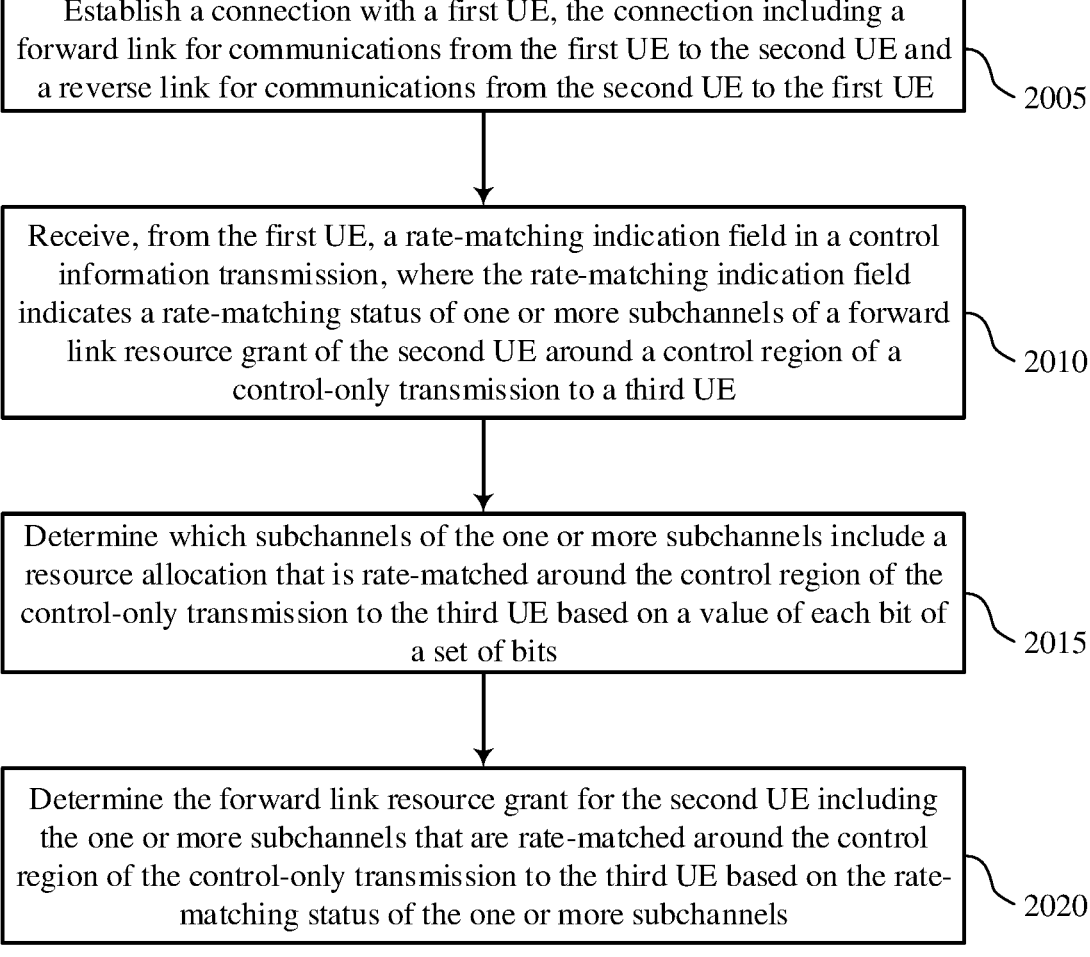

Establish a connection with a first UE, the connection including a forward link for communications from the first UE to the second UE and a reverse link for communications from the second UE to the first UE

2005

Receive, from the first UE, a rate-matching indication field in a control information transmission, where the rate-matching indication field indicates a rate-matching status of one or more subchannels of a forward link resource grant of the second UE around a control region of a control-only transmission to a third UE

2010

Determine which subchannels of the one or more subchannels include a resource allocation that is rate-matched around the control region of the control-only transmission to the third UE based on a value of each bit of a set of bits

2015

Determine the forward link resource grant for the second UE including the one or more subchannels that are rate-matched around the control region of the control-only transmission to the third UE based on the rate-matching status of the one or more subchannels

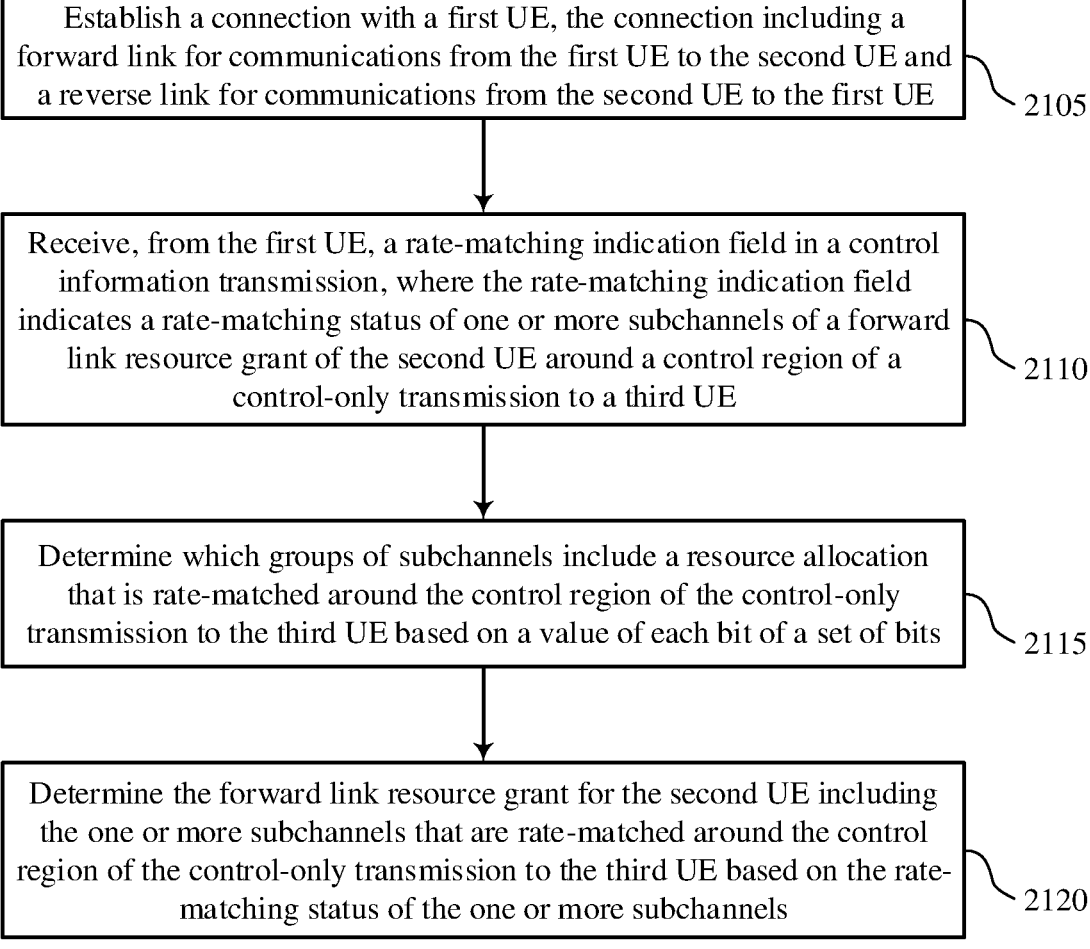

Establish a connection with a first UE, the connection including a forward link for communications from the first UE to the second UE and a reverse link for communications from the second UE to the first UE ～2105

Receive, from the first UE, a rate-matching indication field in a control information transmission, where the rate-matching indication field indicates a rate-matching status of one or more subchannels of a forward link resource grant of the second UE around a control region of a control-only transmission to a third UE ～2110

Determine which groups of subchannels include a resource allocation that is rate-matched around the control region of the control-only transmission to the third UE based on a value of each bit of a set of bits ～2115

Determine the forward link resource grant for the second UE including the one or more subchannels that are rate-matched around the control region of the control-only transmission to the third UE based on the rate-matching status of the one or more subchannels ～2120

RATE-MATCHING INFORMATION FOR A FORWARD LINK RESOURCE GRANT VIA SIDELINK CONTROL INFORMATION

CROSS REFERENCE

The present Application is a 371 national stage filing of International PCT Application No. PCT/CN2020/102078 by XU et al. entitled "RATE-MATCHING INFORMATION FOR A FORWARD LINK RESOURCE GRANT VIA SIDELINK CONTROL INFORMATION," filed Jul. 15, 2020, which is assigned to the assignee hereof, and which is expressly incorporated by reference in its entirety herein.

FIELD OF TECHNOLOGY

The following relates to wireless communications, including rate-matching information for a forward link resource grant via sidelink control information (SCI).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support rate-matching information for a forward link resource grant via sidelink control information (SCI). Generally, the described techniques provide for efficient resource usage for sidelink communications by rate-matching a resource allocation for a forward link transmission around a control region of a control-only transmission. For example, a first user equipment (UE), which may function as an anchor UE, may determine a resource allocation for a second UE, which may function as a client UE, such that the resource allocation for the second UE includes resources that are rate-matched around a control region of a control-only transmission from the first UE to a third UE. The control-only transmission may be an example of a transmission that leaves at least a portion of a shared channel region of a subchannel unused and, by rate-matching the resource allocation for the forward link transmission to the second UE around the control region of the control-only transmission, the first UE may use such a shared channel region that may be otherwise unused.

In some implementations, the first UE may transmit a rate-matching indication field to the second UE in a control information transmission, such as an SCI transmission, that indicates the rate-matching status of one or more subchannels that are allocated for the forward link transmission to the second UE. Such a rate-matching status may indicate whether a resource allocation of a subchannel for the forward link transmission is rate-matched around a control region of the subchannel that is used by a control-only transmission. In some examples, the rate-matching indication field may provide the rate-matching status of the one or more subchannels that are allocated for the forward link transmission to the second UE on a subchannel-by-subchannel basis. For example, the rate-matching indication field may include a set of bits, each bit corresponding to one subchannel, and the value of a bit may indicate whether the corresponding subchannel includes a resource allocation for the forward link transmission that is rate-matched around the control region of the subchannel (e.g., because the control region is used by the control-only transmission).

In some other examples, the rate-matching indication field may provide the rate-matching status of the one or more subchannels that are allocated for the forward link transmission to the second UE on a group-by-group basis. For example, the rate-matching indication field may include a set of bits, each bit corresponding to a group of subchannels, and the value of a bit may indicate whether the corresponding group of subchannels includes a resource allocation for the forward link transmission that is rate-matched around the control region of the subchannel. In some other examples, the rate-matching indication field may provide the rate-matching status of the one or more subchannels as a collective unit. For example, the rate-matching indication field may include a bit and the value of the bit may indicate whether the one or more subchannels include a resource allocation for the forward link transmission that is rate-matched around the control region of the subchannel. In such examples, the second UE may determine that all of the resources allocated for the forward link transmission to the second UE in the one or more subchannels are rate-matched around the control region or that none of the resources allocated for the forward link transmission to the second UE in the one or more subchannels are rate-matched around the control region.

A method of wireless communications at a first UE is described. The method may include establishing a connection with a second UE, the connection including a forward link for communications from the first UE to the second UE and a reverse link for communications from the second UE to the first UE, determining a forward link resource grant for the second UE including one or more subchannels that are rate-matched around a control region of a control-only transmission to a third UE, and transmitting, to the second UE, a rate-matching indication field in a control information transmission, where the rate-matching indication field indicates a rate-matching status of the one or more subchannels of the forward link resource grant around the control region of the control-only transmission to the third UE.

An apparatus for wireless communications at a first UE is described. The apparatus may include a processor, memory coupled with the processor, and instructions stored in the memory. The instructions may be executable by the processor to cause the apparatus to establish a connection with a second UE, the connection including a forward link for communications from the first UE to the second UE and a reverse link for communications from the second UE to the first UE, determine a forward link resource grant for the second UE including one or more subchannels that are rate-matched around a control region of a control-only transmission to a third UE, and transmit, to the second UE, a rate-matching indication field in a control information transmission, where the rate-matching indication field indicates a rate-matching status of the one or more subchannels of the forward link resource grant around the control region of the control-only transmission to the third UE.

Another apparatus for wireless communications at a first UE is described. The apparatus may include means for establishing a connection with a second UE, the connection including a forward link for communications from the first UE to the second UE and a reverse link for communications from the second UE to the first UE, determining a forward link resource grant for the second UE including one or more subchannels that are rate-matched around a control region of a control-only transmission to a third UE, and transmitting, to the second UE, a rate-matching indication field in a control information transmission, where the rate-matching indication field indicates a rate-matching status of the one or more subchannels of the forward link resource grant around the control region of the control-only transmission to the third UE.

A non-transitory computer-readable medium storing code for wireless communications at a first UE is described. The code may include instructions executable by a processor to establish a connection with a second UE, the connection including a forward link for communications from the first UE to the second UE and a reverse link for communications from the second UE to the first UE, determine a forward link resource grant for the second UE including one or more subchannels that are rate-matched around a control region of a control-only transmission to a third UE, and transmit, to the second UE, a rate-matching indication field in a control information transmission, where the rate-matching indication field indicates a rate-matching status of the one or more subchannels of the forward link resource grant around the control region of the control-only transmission to the third UE.

In some examples of the method, apparatuses, and non-transitory computer-readable medium described herein, the rate-matching indication field may include operations, features, means, or instructions for determining a value of the bit to indicate whether a resource allocation in all subchannels of the one or more subchannels may be rate-matched around the control region of the control-only transmission to the third UE.

In some examples of the method, apparatuses, and non-transitory computer-readable medium described herein, the rate-matching indication field may include operations, features, means, or instructions for determining a value of each bit of the set of bits based on which subchannels of the one or more subchannels include a resource allocation that may be rate-matched around the control region of the control-only transmission to the third UE.

In some examples of the method, apparatuses, and non-transitory computer-readable medium described herein, the rate-matching indication field may include operations, features, means, or instructions for determining a value of each bit of the set of bits based on which groups of subchannels include a resource allocation that may be rate-matched around the control region of the control-only transmission to the third UE.

Some examples of the method, apparatuses, and non-transitory computer-readable medium described herein may further include operations, features, means, or instructions for determining a mapping between each bit of the set of bits and each group of subchannels of the one or more subchannels based on a random seed.

In some examples of the method, apparatuses, and non-transitory computer-readable medium described herein, determining the forward link resource grant for the second UE including the one or more subchannels that may be rate-matched around the control region of the control-only transmission to the third UE may include operations, features, means, or instructions for determining that a first set of symbols of a subchannel may be allocated to the control region of the control-only transmission to the third UE, and determining that a second set of symbols of the subchannel after the first set of symbols may be allocated to the forward link resource grant for the second UE.

Some examples of the method, apparatuses, and non-transitory computer-readable medium described herein may further include operations, features, means, or instructions for determining a first location for a first demodulation reference signal (DMRS) associated with the forward link resource grant for the second UE in a second symbol of the second set of symbols, and determining a second location for a second DMRS associated with the forward link resource grant for the second UE in a sixth symbol of the second set of symbols.

Some examples of the method, apparatuses, and non-transitory computer-readable medium described herein may further include operations, features, means, or instructions for transmitting, to the second UE, a forward link transmission over the one or more subchannels based on the rate-matching status of the one or more subchannels.

In some examples of the method, apparatuses, and non-transitory computer-readable medium described herein, the control information transmission includes a first stage SCI transmission.

In some examples of the method, apparatuses, and non-transitory computer-readable medium described herein, the control information transmission includes a second stage SCI transmission.

In some examples of the method, apparatuses, and non-transitory computer-readable medium described herein, the control-only transmission to the third UE includes a resource grant for the third UE or group common SCI.

In some examples of the method, apparatuses, and non-transitory computer-readable medium described herein, the first UE may be an anchor UE and the second UE may be a client UE.

A method of wireless communications at a second UE is described. The method may include establishing a connection with a first UE, the connection including a forward link for communications from the first UE to the second UE and a reverse link for communications from the second UE to the first UE, receiving, from the first UE, a rate-matching indication field in a control information transmission, where the rate-matching indication field indicates a rate-matching status of one or more subchannels of a forward link resource grant of the second UE around a control region of a control-only transmission to a third UE, and determining the forward link resource grant for the second UE including the one or more subchannels that are rate-matched around the control region of the control-only transmission to the third UE based on the rate-matching status of the one or more subchannels.

An apparatus for wireless communications at a second UE is described. The apparatus may include a processor, memory coupled with the processor, and instructions stored in the memory. The instructions may be executable by the processor to cause the apparatus to establish a connection with a first UE, the connection including a forward link for communications from the first UE to the second UE and a reverse link for communications from the second UE to the first UE, receive, from the first UE, a rate-matching indication field in a control information transmission, where the rate-matching indication field indicates a rate-matching status of one or more subchannels of a forward link resource grant of the second UE around a control region of a control-only transmission to a third UE, and determine the forward link resource grant for the second UE including the one or more subchannels that are rate-matched around the control region of the control-only transmission to the third UE based on the rate-matching status of the one or more subchannels.

Another apparatus for wireless communications at a second UE is described. The apparatus may include means for establishing a connection with a first UE, the connection including a forward link for communications from the first UE to the second UE and a reverse link for communications from the second UE to the first UE, receiving, from the first UE, a rate-matching indication field in a control information transmission, where the rate-matching indication field indicates a rate-matching status of one or more subchannels of a forward link resource grant of the second UE around a control region of a control-only transmission to a third UE, and determining the forward link resource grant for the second UE including the one or more subchannels that are rate-matched around the control region of the control-only transmission to the third UE based on the rate-matching status of the one or more subchannels.

A non-transitory computer-readable medium storing code for wireless communications at a second UE is described. The code may include instructions executable by a processor to establish a connection with a first UE, the connection including a forward link for communications from the first UE to the second UE and a reverse link for communications from the second UE to the first UE, receive, from the first UE, a rate-matching indication field in a control information transmission, where the rate-matching indication field indicates a rate-matching status of one or more subchannels of a forward link resource grant of the second UE around a control region of a control-only transmission to a third UE, and determine the forward link resource grant for the second UE including the one or more subchannels that are rate-matched around the control region of the control-only transmission to the third UE based on the rate-matching status of the one or more subchannels.

Some examples of the method, apparatuses, and non-transitory computer-readable medium described herein may further include operations, features, means, or instructions for receiving, from the first UE, a forward link transmission over the one or more subchannels, and decoding the forward link transmission based on the rate-matching status of the one or more subchannels.

In some examples of the method, apparatuses, and non-transitory computer-readable medium described herein, the rate-matching indication field may include operations, features, means, or instructions for determining whether all subchannels of the one or more subchannels include a resource allocation that may be rate-matched around the control region of the control-only transmission to the third UE based on a value of the bit.

In some examples of the method, apparatuses, and non-transitory computer-readable medium described herein, the rate-matching indication field may include operations, features, means, or instructions for determining which subchannels of the one or more subchannels include a resource allocation that may be rate-matched around the control region of the control-only transmission to the third UE based on a value of each bit of the set of bits.

In some examples of the method, apparatuses, and non-transitory computer-readable medium described herein, the rate-matching indication field may include operations, features, means, or instructions for determining which groups of subchannels include a resource allocation that may be rate-matched around the control region of the control-only transmission to the third UE based on a value of each bit of the set of bits.

Some examples of the method, apparatuses, and non-transitory computer-readable medium described herein may further include operations, features, means, or instructions for determining a mapping between each bit of the set of bits and each group of subchannels of the one or more subchannels based on a random seed.

In some examples of the method, apparatuses, and non-transitory computer-readable medium described herein, determining the forward link resource grant for the second UE including the one or more subchannels that may be rate-matched around the control region of the control-only transmission to the third UE may include operations, features, means, or instructions for determining that a first set of symbols of a subchannel may be allocated to the control region of the control-only transmission to the third UE, and determining that a second set of symbols of the subchannel after the first set of symbols may be allocated to the forward link resource grant for the second UE.

Some examples of the method, apparatuses, and non-transitory computer-readable medium described herein may further include operations, features, means, or instructions for determining a first location for a first DMRS associated with the forward link resource grant for the second UE in a second symbol of the second set of symbols, and determining a second location for a second DMRS associated with the forward link resource grant for the second UE in a sixth symbol of the second set of symbols.

In some examples of the method, apparatuses, and non-transitory computer-readable medium described herein, the control information transmission includes a first stage SCI transmission.

In some examples of the method, apparatuses, and non-transitory computer-readable medium described herein, the control information transmission includes a second stage SCI transmission.

In some examples of the method, apparatuses, and non-transitory computer-readable medium described herein, the control-only transmission to the third UE includes a resource grant for the third UE or group common SCI.

In some examples of the method, apparatuses, and non-transitory computer-readable medium described herein, the first UE may be an anchor UE and the second UE may be a client UE.

BRIEF DESCRIPTION OF THE DRAWINGS

FIGS. 3 through 6 illustrate examples of rate-matching configurations that support rate-matching information for a forward link resource grant via SCI in accordance with aspects of the present disclosure.

Figure 7:
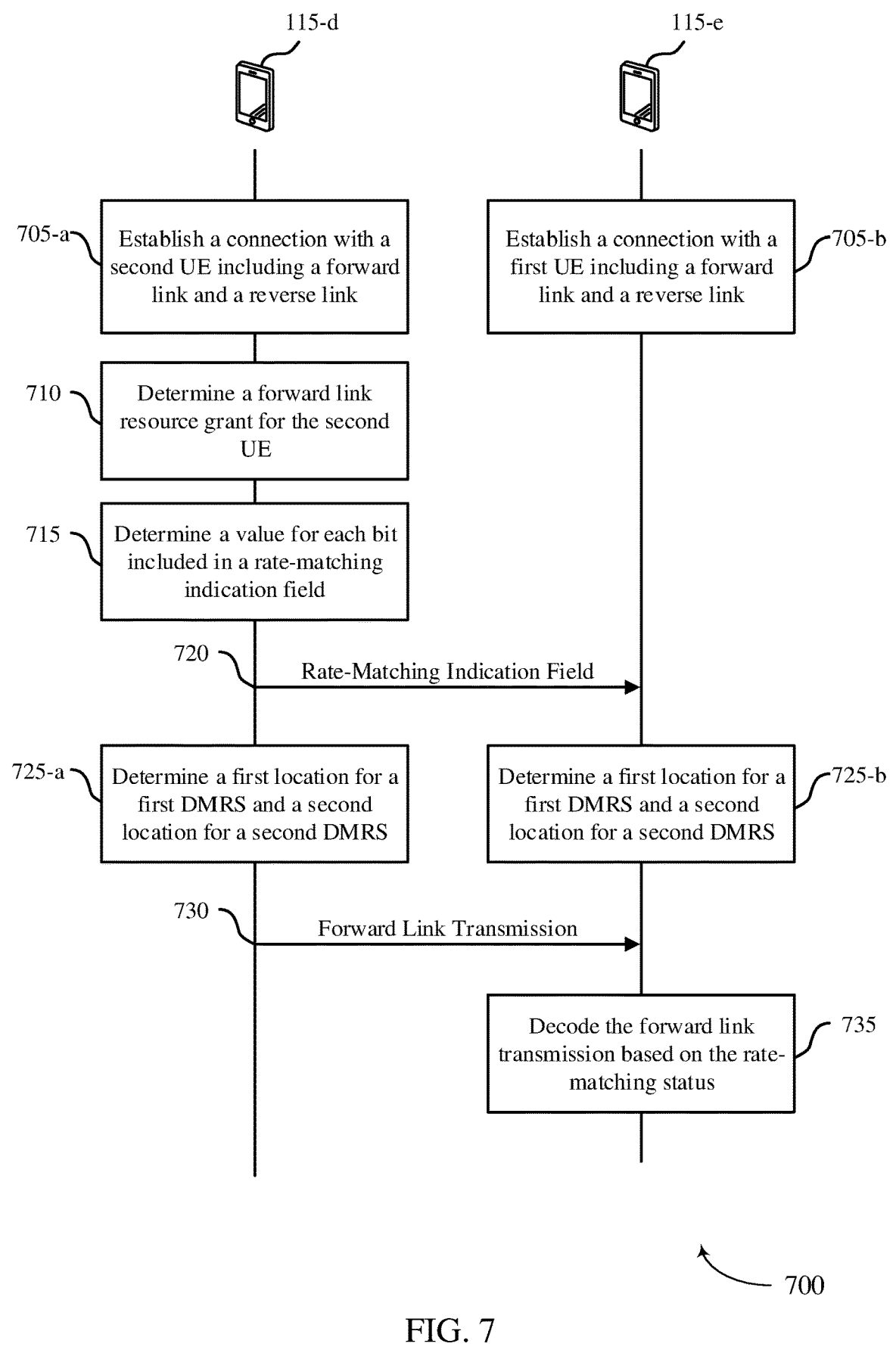

FIG. 7 illustrates an example of a process flow that supports rate-matching information for a forward link resource grant via SCI in accordance with aspects of the present disclosure.

Figure 8:
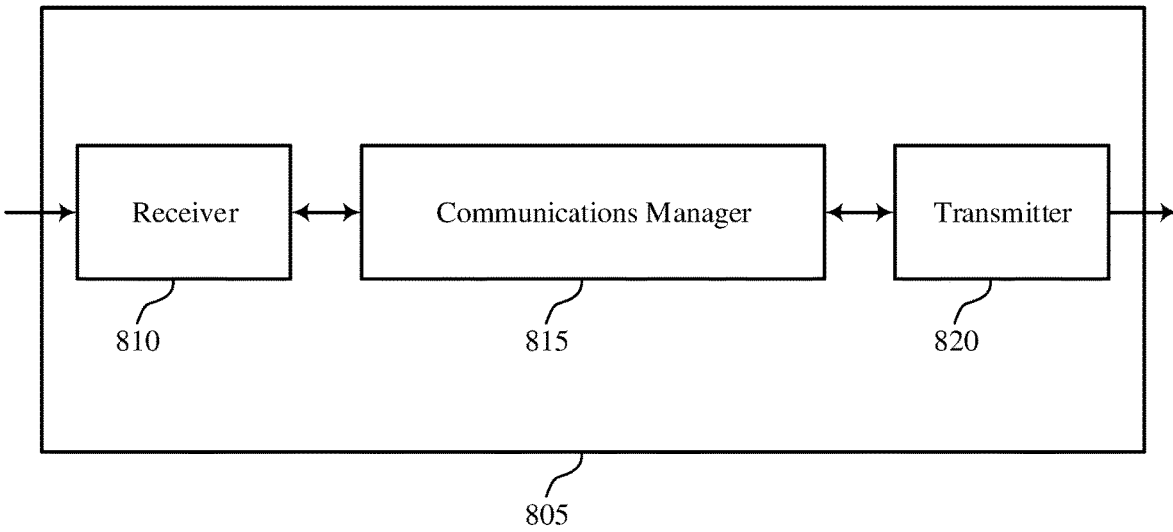
Figure 9:
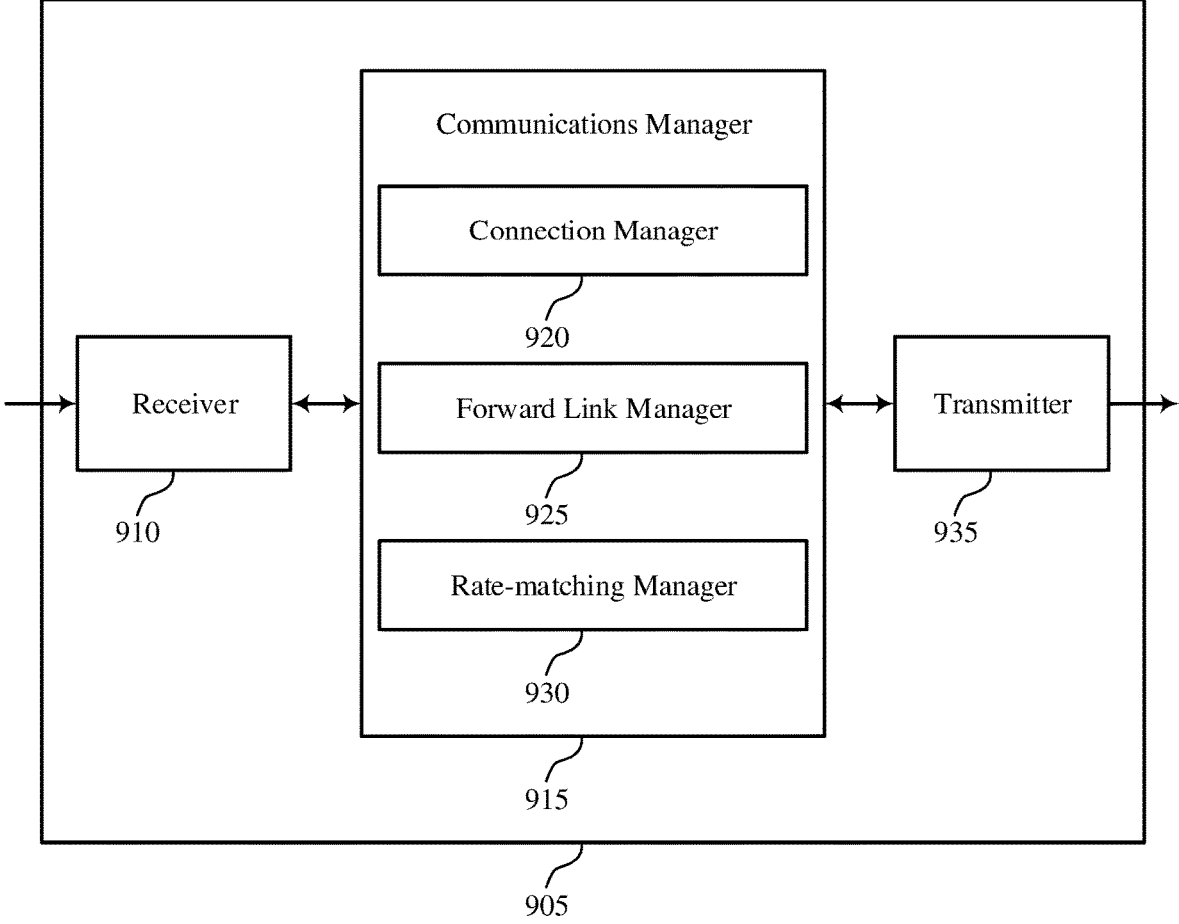

FIGS. 8 and 9 show block diagrams of devices that support rate-matching information for a forward link resource grant via SCI in accordance with aspects of the present disclosure.

Figure 10:
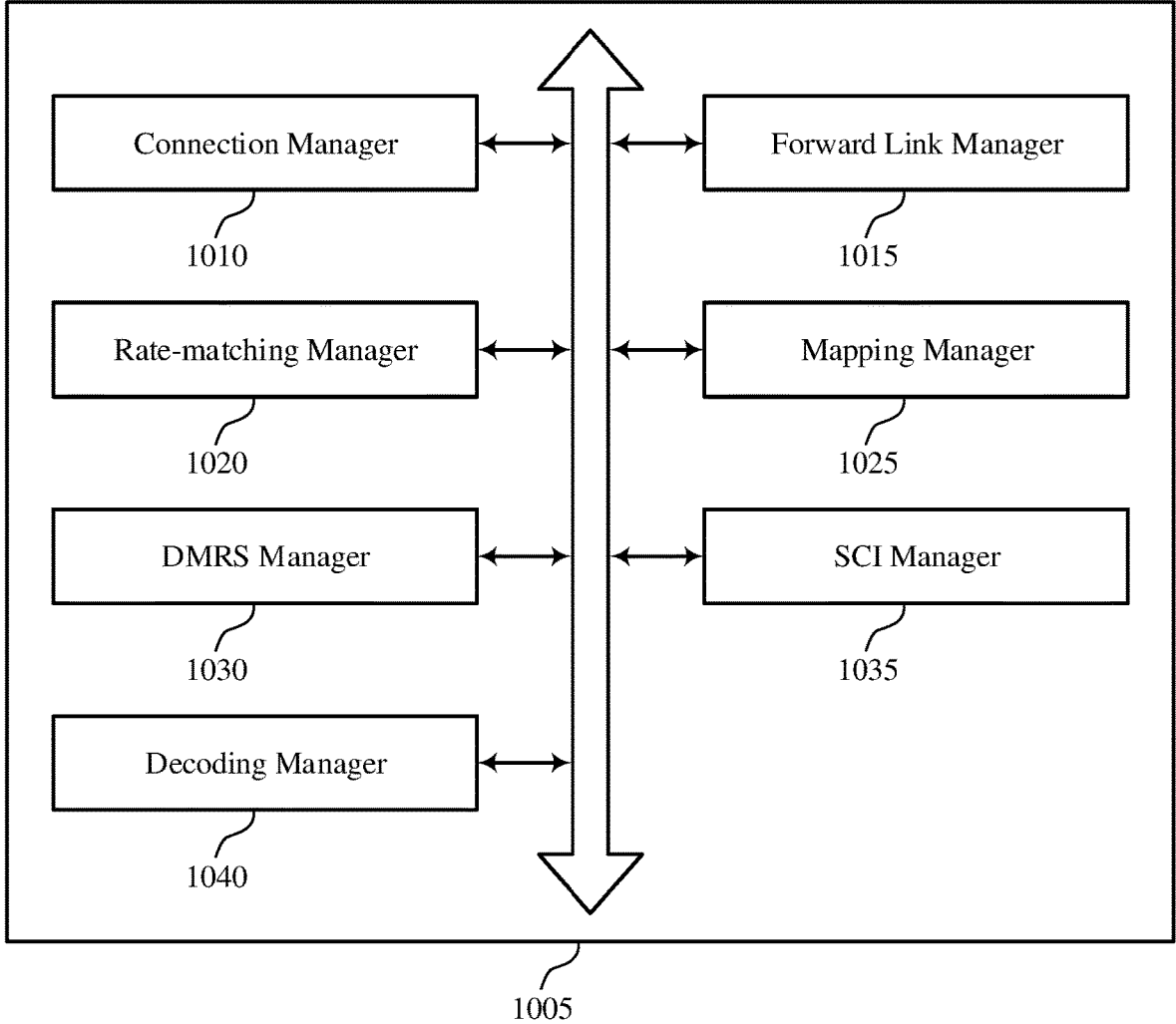

FIG. 10 shows a block diagram of a communications manager that supports rate-matching information for a forward link resource grant via SCI in accordance with aspects of the present disclosure.

Figure 11:
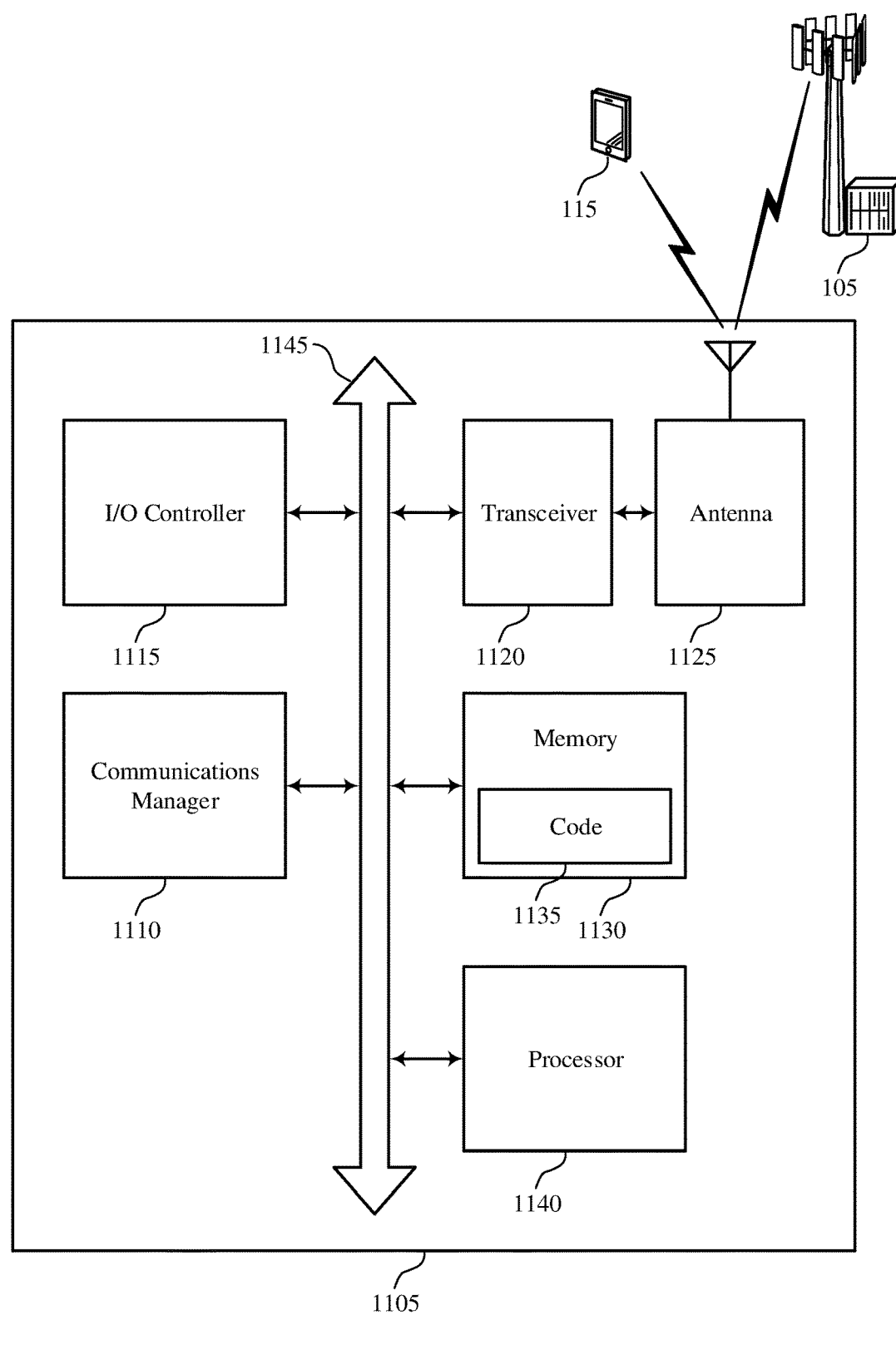

FIG. 11 shows a diagram of a system including a device that supports rate-matching information for a forward link resource grant via SCI in accordance with aspects of the present disclosure.

FIGS. 12 through 21 show flowcharts illustrating methods that support rate-matching information for a forward link resource grant via SCI in accordance with aspects of the present disclosure.

DETAILED DESCRIPTION

In some wireless communications systems, multiple peer devices, such as user equipment (UEs), may communicate with each other over sidelink connections to increase the connectivity of the wireless communications system. In some such peer-to-peer networks, one UE may be designated as an anchor UE and may provide other UEs in the network with scheduling assignments and resource allocations. For example, an anchor UE may transmit a resource grant to a client UE and the client UE may use the resource grant for one or more transmissions from the client UE to the anchor UE. In some cases, the anchor UE may transmit such a resource grant as a control-only transmission. In such cases, the anchor UE may use a control region of a subchannel to transmit the resource grant and may leave at least a portion of a payload region of the subchannel unused. As such, some of the resources in the payload region of the subchannel may be unused, which may be result in inefficient resource usage and adversely affect the achievable throughput of the system. In some other cases, the anchor UE may transmit such a resource grant in second stage sidelink control information (SCI-2), which may use a portion of the otherwise unused payload region of the subchannel. In some cases, however, the anchor UE and the client UE may have a lack of forward link traffic (e.g., communication from the anchor UE to the client UE) and, as such, a portion of the of the payload region of the subchannel may still be unused.

To provide the client UE with the resource grant via the control-only transmission while maintaining efficient resource usage, the anchor UE may allocate the unused resources of the subchannel including the control-only transmission for a forward link transmission to a different client UE (which may be referred to herein as a first client UE). In some cases, however, the first client UE may be unaware of the resources that are used for the control-only transmission, which may result in decoding complications at the first client UE and, as such, a lower likelihood for successful communications between the anchor UE and the first client UE.

In some implementations of the present disclosure, the anchor UE may transmit a rate-matching indication field to the first client UE to indicate which of the subchannels that are allocated to the first client UE include a control-only transmission that the first client UE may rate-match around. For example, the rate-matching indication field may include or otherwise indicate a rate-matching status of the subchannels that are allocated to the first client UE and the first client UE may determine which of the subchannels include resources that rate-matched around the control region of the subchannel (e.g., because the control region of the subchannel carries a control-only transmission) based on the rate-matching status of the subchannels. In some examples, the rate-matching indication may indicate the rate-matching status on a subchannel-by-subchannel basis. In some other examples, the rate-matching indication may indicate the rate-matching status on a group of subchannels-by-group of subchannels basis. In some further examples, the rate-matching indication may indicate a single rate-matching status applicable to all of the subchannels that are allocated to the first client UE. The anchor UE may transmit the rate-matching indication field to the first client UE via either first stage sidelink control information (SCI-1) or SCI-2.

In some additional implementations of the present disclosure, the anchor UE and the second client UE may determine locations (e.g., symbol locations) for demodulation reference signals (DMRSs) within a resource allocation of a subchannel that is rate-matched around a control region of the subchannel. For example, the control region of the subchannel used by the control-only transmission may occupy a first set of symbols of a slot and the resource allocation for the forward link transmission to the first client UE may occupy a second set of symbols of the slot after the first set of symbols. The anchor UE and the first client UE may determine which symbols of the second set of symbols include a DMRS based on a pre-configuration.

Particular aspects of the subject matter described herein may be implemented to realize one or more potential advantages. The described techniques may be implemented to achieve greater resource efficiency in subchannels used for sidelink communications including a control-only transmission, such as a resource grant or group common SCI. For example, based on enabling client UEs to use the remaining resources of a subchannel that is also used for a control-only transmissions, the anchor UE may transmit resource grants to the client UEs without sacrificing resource efficiency and may schedule more communications between the anchor UE and the client UEs, which may result in a higher achievable throughput of the system. Further, the anchor UE may indicate which subchannels include resource allocations that are rate-matched around a control region of a control-only transmission according to various granularities (e.g., per subchannel, per group of subchannels, or a single indication applicable to all subchannels) based on transmitting the rate-matching indication field, which may enable the anchor UE to flexibly prioritize overhead or rate-matching controllability and accuracy depending on the application.

Aspects of the disclosure are initially described in the context of wireless communications systems. Aspects of the disclosure are additionally described in the context of rate-matching configurations and a process flow. Aspects of the disclosure are further illustrated by and described with reference to apparatus diagrams, system diagrams, and flowcharts that relate to rate-matching information for a forward link resource grant via SCI.

Figure 1:
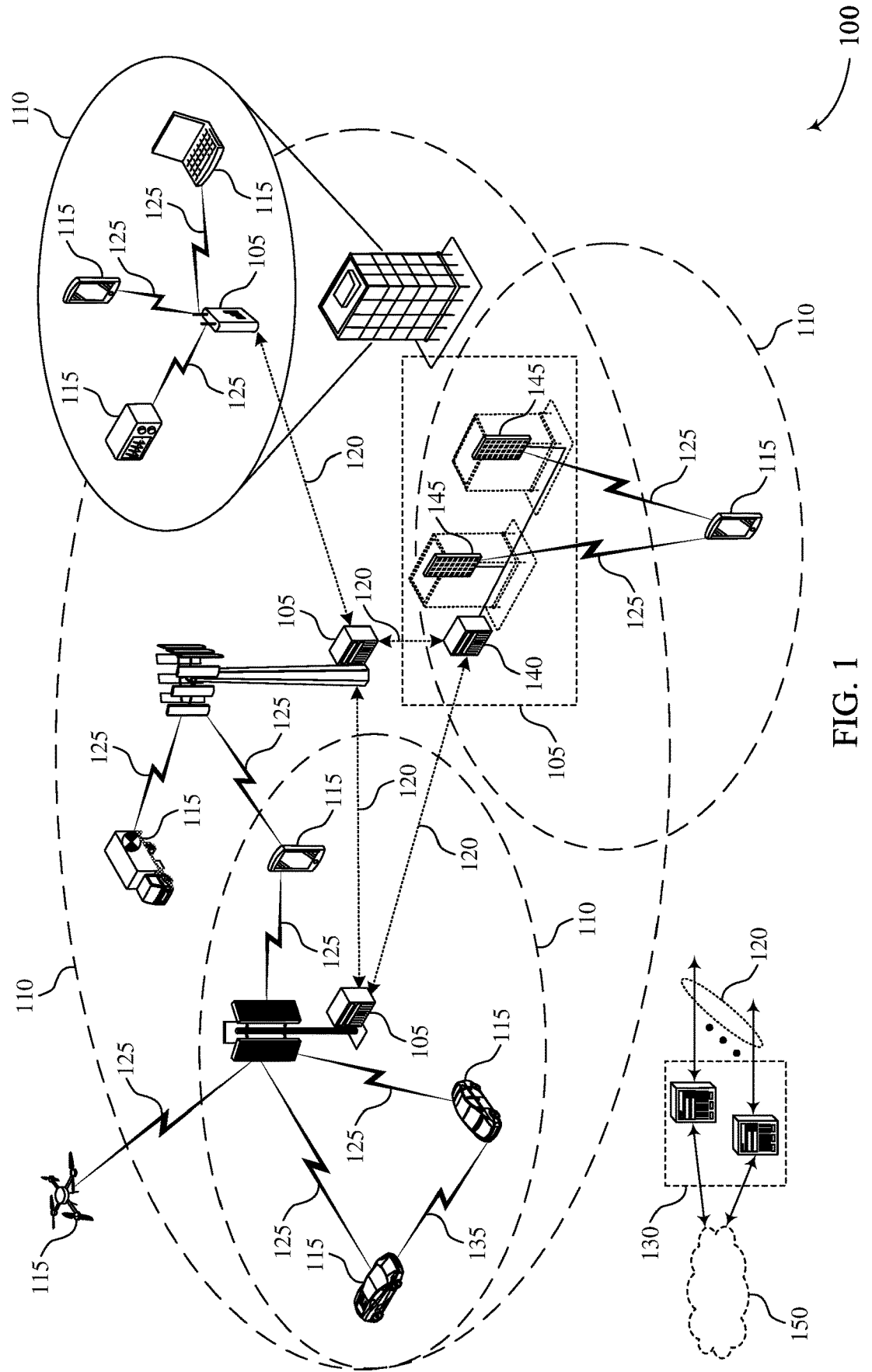
FIGS. 1 and 2 illustrate examples of wireless communications systems that support rate-matching information for a forward link resource grant via sidelink control information (SCI) in accordance with aspects of the present disclosure.

FIG. 1 illustrates an example of a wireless communications system 100 that supports rate-matching information for a forward link resource grant via SCI in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The wireless communications system 100 may support sidelink communications between multiple UEs 115, such as over D2D communication links 135. In some cases, a first UE 115 may communicate with a second UE 115 over a sidelink resource allocation (e.g., a sidelink transmission or reception resource pool). A minimum resource allocation unit for the resource allocation in frequency may be a subchannel and a minimum resource allocation unit for the resource allocation in time may be a slot. Accordingly, the first UE 115 and the second UE 115 may communicate over a resource grid including a number of subchannels in the frequency-domain and a number of slots in the time-domain. In some cases, the first UE 115 and the second UE 115 may determine the resource allocation based on a pre-configuration of the UEs 115. For instance, the resource allocation may be pre-loaded on a UE 115. Additionally, or alternatively, the first UE 115 and the second UE 115 may receive a configuration from a base station 105 including or otherwise indicating the resource allocation. For example, a base station 105 may configure a resource allocation at a UE 115 via RRC signaling.

The intersection of a subchannel in frequency and a slot in time may include a control region and a payload region. For example, each slot of the resource allocation may be associated with a slot structure form including a first number of symbols that are at least partially allocated for a control channel, such as a physical sidelink control channel (PSCCH), and a second number of symbols that are at least partially allocated for a shared channel, such as a physical sidelink shared channel (PSSCH). In some cases, the first UE may use the control region of one subchannel and one slot to transmit a control-only transmission, which may be an example of any transmission that is transmitted over a control region of a subchannel and leaves at least a portion of the payload region of the subchannel unused. In some aspects, the first UE 115 may transmit the control-only transmission to a third UE 115 different than the second UE 115.

In some implementations of the present disclosure, the first UE 115, which may function as an anchor UE 115, may allocate the unused resources of the payload region of the subchannel including the control-only transmission to the second UE 115 to more efficiently use the resources allocated for sidelink communications. In some examples, the first UE 115 may transmit an indication to the second UE 115 to rate-match around the control-only transmission to avoid overbooking resources, which may otherwise occur and may result in decoding complications. For example, the first UE 115 may include a rate-matching indication field in a control information transmission to the second UE 115 that provides rate-matching information to the second UE 115. The rate-matching indication field may include a single bit or multiple bits and may indicate which subchannels of the subchannels that are allocated to the second UE 115 include resources for a forward link transmission to the second UE 115 that are rate-matched around the control region of the subchannel (e.g., in which the control-only transmission may be located). In other words, the rate-matching indication field may indicate a rate-matching status of the subchannels that are allocated for a forward link transmission to the second UE 115. The rate-matching indication field may indicate the rate-matching status of each subchannel, each group of subchannels, or all subchannels that are allocated for the forward link transmission to the second UE 115 collectively. The first UE 115 may transmit the rate-matching indication field to the second UE 115 in SCI-1 or in SCI-2.

Figure 2:
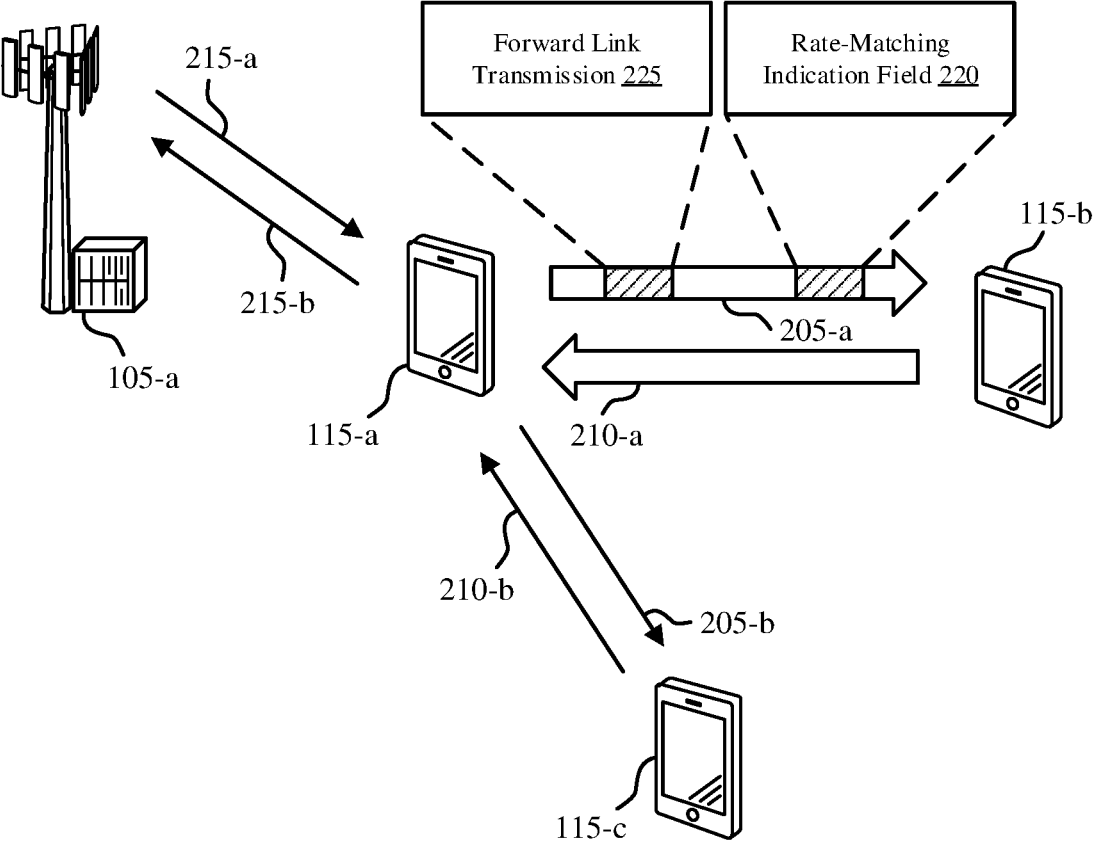

FIG. 2 illustrates an example of a wireless communications system 200 that supports rate-matching information for a forward link resource grant via SCI in accordance with aspects of the present disclosure. In some examples, the wireless communications system 200 may implement aspects of the wireless communications system 100. The wireless communications system 200 may illustrate communications between a UE 115-*a*, a UE 115-*b*, and a UE 115-*c* and communications between a base station 105-*a* and the UE 115-*a*, which may be examples of corresponding devices described herein. In some examples, the UE 115-*a* may transmit a rate-matching indication field 220 to the UE 115-*b* to indicate a rate-matching status of one or more subchannels that are allocated for a forward link transmission 225 to the UE 115-*b*.

The UE 115-*a*, the UE 115-*b*, and the UE 115-*c* may communicate over sidelink connections within a peer-to-peer network or peer-to-peer scenario using resources allocated for sidelink communications. In some cases, the UE 115-*a*, the UE 115-*b*, and the UE 115-*c* may function as vehicles and may accordingly operate within a V2X sidelink communications system. For example, the UEs 115 may operate within an NR sidelink communications system and may communicate with each other via a PC5 interface.

The UEs 115 may determine the resources that are allocated for sidelink communications based on the resource allocation mode of the wireless communications system 200. In a first resource allocation mode, the base station 105-*a* may allocate resources for sidelink communications between the UEs 115. In some examples, for instance, the base station 105-*a* may communicate with the UE 115-*a* over a communications link 215 (including a downlink communications link 215-*a* and an uplink communications link 215-*b*) and may transmit or otherwise provide a resource grant to the UE 115-*a* over the downlink communications link 215-*a*. In some aspects, the resource grant may be a dynamic grant and may dynamically indicate a resource allocation to the UE 115-*a*. In some other examples, the base station 105-*a* may activate a configured (e.g., a previously configured) sidelink grant at the UE 115-*a* that the UE 115-*a* may use for sidelink communications upon activation. For example, the base station 105-*a* may initially configure a grant at the UE 115-*a* and may activate the grant upon transmitting an activation message to the UE 115-*a* over the downlink communications link 215-*a*. In the first resource allocation mode, the UE 115-*a* (e.g., the UE 115 that transmits over the configured or activated resource allocation) may report feedback to the base station 105-*a*. For example, the UE 115-*a* may transmit sidelink feedback information to the base station 105-*a* over the uplink communication link 215-*b*.

In a second resource allocation mode, the UE 115-*a* may autonomously (e.g., without receiving a configuration or signaling from the base station 105-*a*) select resources to use for sidelink communications and may transmit an indication of the selected resources to other UEs 115 via SCI in two stages. For example, the UE 115-*a* may transmit a first stage control message (e.g., SCI-1) over a PSCCH region of a subchannel and the SCI-1 may include information of the selected resource allocation and information relating to decoding the SCI-2 (e.g., the SCI-1 may indicate a resource allocation for both receiving the SCI-2 and for receiving a transmission over a PSSCH). For instance, the SCI-1 may include a priority indication, a PSSCH resource assignment, a resource reservation period (if enabled), a PSSCH DMRS pattern, a second-stage SCI format (e.g., a size of the SCI-2), an amount of resources for the SCI-2, a number of PSSCH DMRS ports, and a modulation and coding scheme (MCS), among any other information that may be relevant for determining a PSSCH allocation and for receiving or decoding the SCI-2. The UE 115-*a* may transmit the SCI-2 over the PSSCH allocation and include information relating to decoding the PSSCH within the SCI-2. For example, the SCI-2 may include a set of bits indicating a layer 1 (L1) destination identifier (e.g., a 16-bit L1 destination ID), a set of bits indicating an L1 source identifier (e.g., an 8-bit L1 source ID), a HARQ process identifier, a new data indicator (NDI), and a redundancy version (RV), among any other information related to decoding a PSSCH. In either resource allocation mode, the signaling on the sidelink between the UEs 115 is the same from the point of view of the receiver.

In some peer-to-peer scenarios (such as in some V2X network scenarios), there may be a lack of a fixed serving relationship between the UEs 115. For example, the UEs 115 may support transmissions between any pair of nodes and, likewise, a UE 115 may transmit or receive to or from one or more other UEs 115 for connectivity purposes and may implement screening techniques (such as a destination ID in SCI-2) to discard unrelated transmissions. In such scenarios, sidelink transmissions are transmitter-driven such that the transmitting device may determine when to transmit. Such a lack of a fixed serving relationship between the UEs 115 in the system may not be applicable to or fit all use cases, however. For example, some Internet of Things (IoT) applications may support a programmable logic controller (PLC) to scheduling assignment (SA) link using sidelink communications. In such applications, the PLC may function as a central node and one PLC may be shared across multiple SA nodes. For further example, some eMBB applications may designate an anchor UE that serves other UEs. As such, an option for an anchor-based operation scenario in sidelink networks may provide flexible adaptation to various use cases and applications while maintaining the high levels of connectivity associated with sidelink communications. For example, the UE 115-*a* may be designated as an anchor UE 115-*a* and may function as a PLC in IoT applications or as an anchor for eMBB or NR-U applications. In such an anchor-client network architecture, the UE 115-*a* may schedule transmissions from a client (e.g., either the UE 115-b or the UE 115-c) to the UE 115-a, which may result in better system and resource efficiency.

For example, the UE 115-a may function in a control role, such as in a scheduling role, in the wireless communications system 200 for the UE 115-b and the UE 115-c (which may be examples of client devices of the anchor UE 115-a). In some aspects, the relationship between the UE 115-a and the client devices of the UE 115-a may feature similarities to the relationship between the base station 105-a and served UEs 115. For example, some Uu interface-based features may be ported to the PC5 interface between UEs 115. The anchor UE 115-a may operate in either the first resource allocation mode (e.g., receive resource grants from the base station 105-a) or the second resource allocation mode (e.g., autonomously select resource grants). Upon designation as the anchor, the UE 115-a may transmit system parameters to the UE 115-b and the UE 115-c that the UE 115-b and the UE 115-c may use to transmit or receive communications. Additionally, in some cases, the UE 115-a may provide RRC configurations to the UE 115-b and the UE 115-c (e.g., RRC configurations specific to the UE 115-b and the UE 115-c). The UE 115-a may provide scheduling information for both the UE 115-b and the UE 115-c and each of the UE 115-b and the UE 115-c may be served by a single anchor UE 115-a. In some cases, the sidelink between the UE 115-a and each of the UE 115-b and the UE 115-c may be relatively stable and the UE 115-a may ignore communications between the UE 115-b and the UE 115-c (which may be referred to as client-to-client communications).

The link over which the UE 115-a may transmit to a client UE 115 (such as the UE 115-b or the UE 115-c) may be referred to as a forward link 205. For example, the UE 115-a may send transmissions to the UE 115-b over a forward link 205-a and may send transmissions to the UE 115-c over a forward link 205-b. Likewise, the link over which a client UE 115 may transmit to the UE 115-a may be referred to as a reverse link 210. For example, the UE 115-b may send transmissions to the UE 115-a over a reverse link 210-a and the UE 115-c may send transmissions to the UE 115-a over a reverse link 210-b. Accordingly, in examples in which the wireless communications system 200 includes an anchor-client communications architecture, the UE 115-a (the anchor) may transmit resource allocations and scheduling information over a forward link 205 to a client UE 115 that the client UE 115 may use for transmitting a reverse link transmission from the client UE 115 to the UE 115-a. For example, the UE 115-a may transmit a resource allocation, which may be referred to herein as a reverse link resource grant, to the UE 115-b that the UE 115-b may use for transmitting a reverse link transmission over the reverse link 210-a to the UE 115-a.

In some cases, the UE 115-a may transmit such a reverse link resource grant to a client UE 115 in an uplink grant only transmission. Such an uplink grant only transmission, however, may be allocated a subchannel but may only use a control region of the subchannel, potentially leaving a payload region of the subchannel unused. For example, the UE 115-a may transmit the reverse link resource grant using a reduced-size slot-like structure (e.g., a mini-slot like structure) that includes a first number of symbols of a slot in the subchannel (e.g., the first four symbols of the slot in the subchannel) and may leave the remaining symbols of the slot in the subchannel unused. As such, the remaining symbols of the slot in the subchannel may be wasted (e.g., not be used to carry communications). Such resource inefficiency may be multiplied in examples in which the UE 115-a transmits reverse link resource grants to multiple client UEs 115. In some other cases, the UE 115-a may transmit such a reverse link resource grant to a client UE 115 in the SCI-2 portion of a forward link transmission to the client UE 115, however this approach may also be associated with sub-resource efficiency in examples in which there is no forward link traffic to the client UE 115. Similar issues may arise for other types of control-only transmissions from the UE 115-a to a client UE 115, such as group common SCI, that may not use a full subchannel for a full slot (e.g., transmissions that only include SCI-1 and SCI-2 or transmissions that otherwise may not use a full payload region of a subchannel).

In some implementations of the present disclosure, the anchor UE 115-a may allocate the remaining resources (e.g., the remaining symbols) of a subchannel in a slot including a control-only transmission together with other subchannels that are allocated for a forward link transmission 225 to a different client UE 115 than the client UE 115 receiving the control-only transmission. For example, the UE 115-a may transmit the control-only transmission to the UE 115-c over the forward link 205-b and may allocate the remaining symbols of the subchannel in the slot including the control-only transmission to a forward link resource grant for the UE 115-b. In other words, the UE 115-b may use a number of subchannels (e.g., a number of subchannels that are either allocated to the UE 115-b or that are used for uplink grant only UEs 115) and the SCI-2 and the PSSCH of the subchannels used by the UE 115-b may avoid the resources used to transmit the reverse link resource grant from the UE 115-a to the UE 115-c. A similar allocation process may be performed in examples in which the subchannels allocated for the forward link transmission 225 to the UE 115-b include multiple control-only transmissions transmitted to or from multiple different client UEs 115 such that the SCI-2 and the PSSCH of the subchannels allocated to the UE 115-b avoid the resources used by the multiple control-only transmissions. Accordingly, the UE 115-a may transmit an indication to the UE 115-b to inform the UE 115-b on how to rate-match around the control-only transmissions within the subchannels allocated for the forward link transmission 225 to the UE 115-b.

In some examples, the UE 115-a may transmit a rate-matching indication field 220 to the UE 115-b to indicate which of the subchannels that are allocated for the forward link transmission 225 to the UE 115-b include control-only transmissions that the UE 115-b may rate-match around. For example, the UE 115-a may define a rate-matching resource set as the resources used to carry control-only transmissions and may use the rate-matching indication field 220 to indicate to the UE 115-b how the UE 115-b may rate-match around the resources carrying the control-only transmissions. The UE 115-a may transmit the rate-matching indication field 220 to the UE 115-b in either SCI-1 or SCI-2, as described in more detail herein, including with reference to FIGS. 3 and 4, respectively.

The UE 115-a may provide an indication of whether a control-region of each of the one or more subchannels that are allocated for the forward link transmission 225 to the UE 115-b include a control-only transmission via the rate-matching indication field 220. For example, each subchannel in a slot may include a control region and a payload region and the rate-matching indication field 220 may indicate whether or not a control region of each of the subchannels that are allocated for the forward link transmission 225 to the UE 115-b includes a control-only transmission. Such an indication of which subchannels include control regions that are used for a control-only transmission (and that the UE 115-*a* may thus rate match around to transmit the forward link transmission 225 and that the UE 115-*b* may rate-match around to receive and decode the forward link transmission 225) may be referred to herein as a rate-matching status of the subchannels that are allocated for the forward link transmission 225 to the UE 115-*b*. In some examples, the UE 115-*a* may convey the rate-matching status of the subchannels via one or more bits in the rate-matching indication field 220. The rate-matching indication field 220 may convey the rate-matching status of the subchannels that are allocated to the UE 115-*b* with various resolution or granularity, as described in more detail herein, including with reference to FIG. 5.

Additionally, in some implementations, the UE 115-*a* and the UE 115-*b* may determine locations for DMRSs within the subchannels and slots that include a control-only transmission based on a quantity of symbols in a slot that are allocated for the forward link transmission 225 to the UE 115-*b*. For example, in a subchannel and slot that includes a control-only transmission that the UE 115-*b* may rate-match around, a first set of symbols of the subchannel in the slot may be allocated for the control-only transmission (e.g., the first set of symbols of the subchannel in the slot may be associated with the control region of the subchannel that may carry the control-only transmission) and a second set of symbols of the subchannel in the slot may be allocated for the UE 115-*b* (e.g., the second set of symbols of the subchannel in the slot may be associated with the payload region of the subchannel that is unused by the control-only transmission). Accordingly, the UE 115-*a* and the UE 115-*b* may identify or otherwise determine a DMRS pattern for the rate-matched resources (e.g., the resources in the second set of symbols of the subchannel in the slot) based on a quantity of the second set of symbols. Additional details relating to determining the DMRS pattern on rate-matched subchannels are described herein, including with reference to FIG. 6.

As such, the UE 115-*b* may determine how to rate-match the resource allocation of the UE 115-*b* based on the rate-matching indication field 220 and may determine a DMRS pattern for each rate-matched subchannel based on the quantity of symbols in a slot that are allocated for the forward link transmission 225 to the UE 115-*b*. The UE 115-*a* may transmit the forward link transmission 225 to the UE 115-*b* over the forward link 205-*a* accordingly. Likewise, the UE 115-*b* may receive the forward link transmission 225 from the UE 115-*a* over the reverse link 205-*a* and may decode the forward link transmission 225 based on the rate-matching status of the subchannels that carry the forward link transmission 225.

Figure 3:
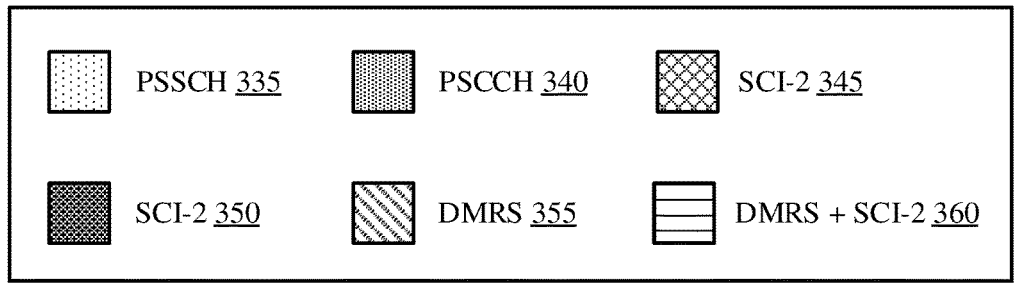

FIG. 3 illustrates an example of a rate-matching configuration 300 that supports rate-matching information for a forward link resource grant via SCI in accordance with aspects of the present disclosure. In some examples, the rate-matching configuration 300 may be implemented to realize aspects of the wireless communications system 100 and the wireless communications system 200. The rate-matching configuration 300 illustrates a subchannel 305-*a* and a subchannel 305-*b* within a slot 365 that may carry communications between an anchor UE 115 and one or more client UEs 115. In some examples, the anchor UE 115 may allocate the subchannel 305-*a* and the subchannel 305-*b* to a first client UE 115 and may transmit a rate-matching indication field 315 to the first client UE 115 to indicate the first client UE 115 to rate-match around a control region 320 used for a control-only transmission, such as a reverse link resource grant or group common SCI.

The subchannels 305 may each include a PSSCH 335, a PSCCH 340, and DMRSs 355. In some cases, the first OFDM symbol 310 of the slot 365 may be used for repetition of the second OFDM symbol 310 for automatic gain control (AGC) and the last OFDM symbol 310 of the slot 365 may be used as a gap between the slot 365 and a first OFDM symbol of a subsequent slot. The PSCCH 340 of each subchannel 305 may have a configured or pre-configured duration of two or three OFDM symbols 310 and may accordingly be located in the first two or three OFDM symbols 310 after the first OFDM symbol 310 of the slot 365 that is used for repetition. In some cases, the SCI-2 345 may be piggybacked over PSSCH 335 and mapped to contiguous resource blocks (RBs) in the PSSCH 335 starting from the first OFDM symbol 310 with PSSCH DMRS 355 or DMRS+SCI-2 360. The DMRS+SCI-2 360 may refer to a multiplexing (e.g., frequency division multiplexing (FDM)) of DMRS 355 and SCI-2 345 within an OFDM symbol 310.

The control region 320 may illustrate a region of the subchannel 305-*b* that is allocated for a control-only transmission. In some examples, the anchor UE 115 may use the control region 320 to transmit a control-only transmission (e.g., a reverse link resource grant or group common SCI) to a second client UE 115. In such examples, the control region 320 may include SCI-1 330 within the PSCCH 340 of the subchannel 305-*b* and SCI-2 350, which may be within a PSSCH allocation within the control region 320.

In some implementations, the anchor UE 115 and the client UEs 115 may identify or otherwise determine the control region 320 based on a definition of a time and frequency resource allocation within a subchannel 305. In some aspects, the control region 320 may be pre-defined at both the anchor UE 115 and the client UEs 115 or the anchor UE 115 may transmit an indication of the control region 320 to the client UEs 115 (such as via the rate-matching indication field 315). The control region 320 may include the PSCCH 340 region and any remaining time or frequency resources within the control region 320 (such as any time or frequency resources allocated for PSSCH within the control region 320) may include the SCI-2 350 and DMRS for SCI-2 350. For example, the control region 320 may be defined as the first four OFDM symbols 310 in the slot 365 and as all RBs within the subchannel 305. Further, although shown as only located in the subchannel 305-*b*, the subchannel 305-*a* may be associated with the same configured control region 320.

In some examples, the anchor UE 115 may transmit a control-only transmission in the control region 320 of the subchannel 305-*b* to the second client UE 115, but may allocate the subchannel 305-*a* and the subchannel 305-*b* to the first client UE 115 for a forward link transmission via PSSCH 335. The SCI-1 325 granting the PSSCH 335 within the subchannel 305-*b* may be located in subchannel 305-*a* (e.g., a different subchannel 305 than the subchannel 305-*b*) and may be included by a single subchannel (e.g., the SCI-1 325 may be fully included within the subchannel 305-*a* and, as such, the first client UE 115 may refrain from rate-matching SCI-1 325).

To enable the first client UE 115 to receive a forward link transmission over the PSSCH 335 that is rate-matched around the control region 320 in the subchannel 305-*b*, the anchor UE 115 may transmit the rate-matching indication field 315 to the first client UE 115 in the SCI-1 325. The rate-matching indication field 315 may provide an indication on which subchannel 305 (or subchannels 305) includes a control region 320 that the first client UE 115 may rate-match around. For example, the rate-matching indication field 315 may indicate a rate-matching status of the sub-channels 305 that are allocated for a forward link transmission to the first client UE 115. In some specific examples, and as illustrated by the rate-matching configuration 300, the rate-matching indication field 315 may indicate that the first client UE 115 may rate-match the PSSCH 335 allocated to the first client UE 115 around the control region 320 of the subchannel 305-*b*. In examples in which the anchor UE 115 transmits the rate-matching indication field 315 to the first client UE 115 in SCI-1 325, both the SCI-2 345 and the PSSCH 340 may be rate-matched around the control region 320 in the subchannel 305-*b*. For instance, both the SCI-2 345 and the PSSCH 335 may include resources in both the subchannel 305-*a* and the subchannel 305-*b*, and the resources within the subchannel 305-*b* may be rate-matched around the control region 320. Alternatively, the anchor UE 115 may transmit the rate-matching indication 315 within the SCI-2 345, as described in more detail herein, including with reference to FIG. 4.

Figure 4:
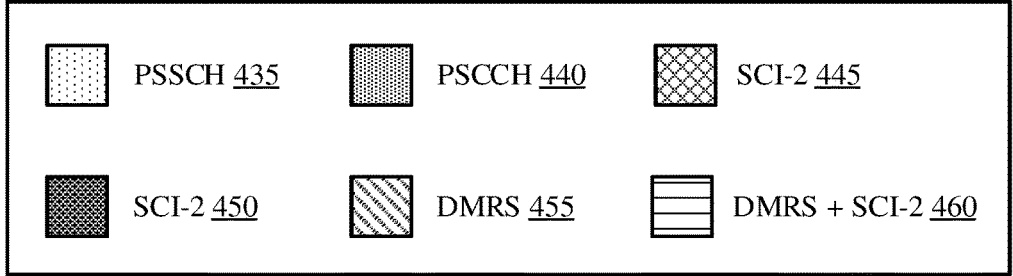

FIG. 4 illustrates an example of a rate-matching configuration 400 that supports rate-matching information for a forward link resource grant via SCI in accordance with aspects of the present disclosure. In some examples, the rate-matching configuration 400 may be implemented to realize aspects of the wireless communications system 100 and the wireless communications system 200. The rate-matching configuration 400 illustrates a subchannel 405-*a* and a subchannel 405-*b* within a slot 465 that may carry communications between an anchor UE 115 and one or more client UEs 115. In some examples, the anchor UE 115 may allocate the subchannel 405-*a* and the subchannel 405-*b* to a first client UE 115 and may transmit a rate-matching indication field 415 to the first client UE 115 to indicate the first client UE 115 to rate-match around a control region 420 used for a control-only transmission, such as a reverse link resource grant or group common SCI.

The subchannels 405 may each include a PSSCH 435, a PSCCH 440, and DMRSs 455. In some cases, the first OFDM symbol 410 of the slot 465 may be used for repetition of the second OFDM symbol 410 for AGC and the last OFDM symbol 410 of the slot 465 may be used as a gap between the slot 465 and a first OFDM symbol of a subsequent slot. The PSCCH 440 of each subchannel 405 may have a configured or pre-configured duration of two or three OFDM symbols 410 and may accordingly be located in the first two or three OFDM symbols 410 after the first OFDM symbol 410 of the slot 465 that is used for repetition. In some cases, the SCI-2 445 may be piggybacked over PSSCH 435 and mapped to contiguous RBs in the PSSCH 435 starting from the first OFDM symbol 410 with PSSCH DMRS 455 or DMRS+SCI-2 460. The DMRS+SCI-2 460 may refer to a multiplexing (e.g., FDM) of DMRS 455 and SCI-2 445 within an OFDM symbol 410.

The control region 420 may illustrate a region of the subchannel 405-*b* that is allocated for a control-only transmission. In some examples, the anchor UE 115 may use the control region 420 to transmit a control-only transmission (e.g., a reverse link resource grant or group common SCI) to a second client UE 115. In such examples, the control region 420 may include SCI-1 430 within the PSCCH 440 of the subchannel 405-*b* and the SCI-2 450, which may be within a PSSCH allocation within the control region 420.

In some implementations, the anchor UE 115 and the client UEs 115 may identify or otherwise determine the control region 420 based on a definition of a time and frequency resource allocation within a subchannel 405. In some aspects, the control region 420 may be pre-defined at both the anchor UE 115 and the client UEs 115 or the anchor UE 115 may transmit an indication of the control region 420 to the client UEs 115 (such as via the rate-matching indication field 415). The control region 420 may include the PSCCH 440 region and any remaining time or frequency resources within the control region 420 (such as any time or frequency resources allocated for PSSCH within the control region 420) may include the SCI-2 450 and DMRS for SCI-2 450. For example, the control region 420 may be defined as the first four OFDM symbols 410 in the slot 465 and as all RBs within the subchannel 405. Further, although shown as only located in the subchannel 405-*b*, the subchannel 405-*a* may be associated with the same configured control region 420.

In some examples, the anchor UE 115 may transmit a control-only transmission in the control region 420 of the subchannel 405-*b* to the second client UE 115, but may allocate the subchannel 405-*a* and the subchannel 405-*b* to the first client UE 115 for PSSCH 435. The SCI-1 425 granting the PSSCH 435 within the subchannel 405-*b* may be located in subchannel 405-*a* (e.g., a different subchannel 405 than the subchannel 405-*b*) and may be included by a single subchannel 405 (e.g., the SCI-1 425 may be fully included within the subchannel 405-*a* and, as such, the first client UE 115 may refrain from rate-matching SCI-1 425).

To enable the first client UE 115 to receive a forward link transmission over the PSSCH 435 that is rate-matched around the control region 420 in the subchannel 405-*b*, the anchor UE 115 may transmit the rate-matching indication field 415 to the first client UE 115 in the SCI-2 345. The rate-matching indication field 415 may provide an indication on which subchannel 405 (or subchannels 405) includes a control region 420 that the first client UE may rate-match around. For example, the rate-matching indication field 415 may indicate a rate-matching status of the subchannels 405 that are allocated to the first client UE 115. In some specific examples, and as illustrated by the rate-matching configuration 400, the rate-matching indication field 415 may indicate that the first client UE 115 may rate-match the PSSCH 435 allocated to the first client UE 115 within the subchannel 405-*b* around the control region 420 of the subchannel 405-*b*. In examples in which the anchor UE 115 transmits the rate-matching indication field 415 to the first client UE 115 in SCI-2 445, the PSSCH 435 may be rate-matched around the control region 420 in the subchannel 405-*b* and the SCI-2 445 may not be rate-matched around the control region 420 in the subchannel 405-*b*. For instance, the PSSCH 435 may include resources in both the subchannel 405-*a* and the subchannel 405-*b* and the resources within the subchannel 405-*b* may be rate-matched around the control region 420. On the other hand, the SCI-2 445 may be fully included within the subchannel 405-*a* and, as such, SCI-2 445 may be rate-matched in the same subchannel 405-*a* as the SCI-1 425.

FIG. 5 illustrates an example of a rate-matching configuration 500 that supports rate-matching information for a forward link resource grant via SCI in accordance with aspects of the present disclosure. In some examples, the rate-matching configuration 500 may be implemented to realize aspects of the wireless communications system 100 and the wireless communications system 200. The rate-matching configuration 500 illustrates a set of subchannels 505 that are allocated to a client UE 115, which may be an example of a first client UE as described with reference to FIGS. 3 and 4. In some examples, an anchor UE 115 may transmit a rate-matching indication field that indicates a rate-matching status of the subchannels 505 that are allocated to the client UE.

For example, the anchor UE 115 may allocate a subchannel 505-*a*, a subchannel 505-*b*, a subchannel 505-*c*, a subchannel 505-*d*, a subchannel 505-*d*, a subchannel 505-*e*, a subchannel 505-*f*, a subchannel 505-*g*, a subchannel 505-*h*, and a subchannel 505-*i* to the client UE 115, may allocate a control region of at least some of the subchannels 505 for control-only transmissions, such uplink grants 520, and may transmit a rate-matching indication field that indicates on which subchannels 505 the client UE 115 may using rate-matching. As shown by the rate-matching configuration 500, the anchor UE 115 may allocate a control region of the subchannel 505-*f* to an uplink grant 520-*a*, a control region of the subchannel 505-*g* to an uplink grant 520-*b*, a control region of the subchannel 505-*h* to an uplink grant 520-*c*, and a control region of the subchannel 505-*i* to an uplink grant 520-*d*, where each of the subchannels 505 that include uplink grants 520 may lack forward link traffic to a corresponding UE 115. For example, the uplink grant 520-*a* may associated with a first UE 115 (a UE0), the uplink grant 520-*b* may be associated with a second UE 115 (a UE1), the uplink grant 520-*c* may be associated with a third UE 115 (a UE2), and the uplink grant 520-*d* may be associated with a fourth UE 115 (a UE3) and there may be a lack of forward link traffic from the anchor UE 115 to first, second, third, and fourth UEs 115 in the subchannel including their associated uplink grant 520. Further, although the rate-matching configuration 500 illustrates four subchannels 505 that include a control region that is occupied by a control-only transmission, any number of subchannels 505 may include a control region that is occupied by a control-only transmission without exceeding the scope of the present disclosure.

In some implementations of the present disclosure, the anchor UE 115 may transmit a rate-matching indication field to the client UE 115 in either SCI-1 carried by PSCCH 515 or in SCI-2 carried by PSSCH 510 that may indicate which subchannels 505 that are allocated to the client UE 115 include PSSCH 510 resources that are rate-matched around the control region of the subchannel. As described herein, such an indication of which subchannels 505 include PSSCH 510 resources that are rate-matched around the control region of the subchannel 505 may be referred to as a rate-matching status of the subchannels 505. The anchor UE 115 may convey the rate-matching status of the subchannels 505 via one or more bits in the rate-matching indication field. Additionally, the anchor UE 115 may convey the rate-matching status of the subchannels 505 according to various granularities, such as subchannel-by-subchannel, group of subchannel-by-group of subchannel, or as a collective (e.g., all or none) of the subchannels 505.

For instance, in some examples, the rate-matching indication field may convey, indicate, or otherwise provide the client UE 115 with a rate-matching status of each individual subchannel 505. In such examples, the rate-matching indication field may include a set of bits having a quantity equal to the quantity of additional subchannels 505 that are allocated to the client UE 115 (e.g., the quantity of the subchannels 505 in addition to the subchannel 505-*a*, such as the quantity of subchannel 505-*b* to subchannel 505-*i*, which may be equal to eight). For example, the rate-matching indication field may include eight bits for the eight subchannels 505 that are allocated to the client UE 115 in addition to the subchannel 505-*a* that includes the PSCCH 515. Generally, the rate-matching indication field may include X bits for X additional subchannels 505 that are allocated to the client UE 115. The anchor UE 115 may determine a value of each of the quantity of bits based a correspondence between the bits and the subchannels 505 and the rate-matching status of each subchannel 505. The anchor UE 115 may determine a correspondence between the quantity of bits (which may be a bitfield or a bitstream) and the subchannels 505 such that each bit corresponds to one of the additional subchannels 505. For example, a first bit of the quantity of bits may correspond to the subchannel 505-*b*, a second bit of the quantity of bits may correspond to the subchannel 505-*c*, a third bit of the quantity of bits may correspond to the subchannel 505-*d*, and an $X^{th}$ bit may correspond to the $X^{th}$ additional subchannel 505. The client UE 115 may determine the same correspondence as the anchor UE 115.

In some implementations, the bitfield length may be based on a scenario in which an upper limit (e.g., a largest or a maximum) of subchannels 505 include a control-only transmission in the control region of the subchannel. For example, the anchor UE 115 may determine a largest assignment (e.g., which may be referred to as a worst case scenario) and may budget the bitfield length based on the largest assignment. In such examples, the quantity of bits may be independent of the number of subchannels 505 that are assigned an uplink grant 520. In other words, the bitfield length may be constant regardless of how many subchannels 505 include a control-only transmission. Alternatively, the anchor UE 115 may determine the bitfield length based on the number of subchannels 505 that include a control-only transmission. In such examples, the anchor UE 115 may configure which subchannels will carry a control-only transmission according to a pattern such that the client UE 115 can determine which subchannels 505 include a control-only transmission based on the bitfield length. For example, the anchor UE 115 may allocate the uplink grants 520 to control regions starting at the lowest subchannel 505 allocated to the client UE 115 (e.g., subchannel 505-*i*) and may incrementally use the next-lowest subchannel 505 for each additional uplink grant 520 allocated to a control region of a subchannel 505 allocated to the client UE 115.

The anchor UE 115 may determine a value of each bit based on the rate-matching status of the subchannel 505 that the bit corresponds to. For example, the first bit may indicate the rate-matching status of the subchannel 505-*b*, the second bit may indicate the rate-matching status of the subchannel 505-*c*, the third bit may indicate the rate-matching status of the subchannel 505-*d*, and the $X^{th}$ bit may indicate the rate-matching status of the $X^{th}$ additional subchannel 505. In some examples, a first value of the bit may indicate that the PSSCH 510 of the subchannel 505 is not rate-matched around the control region of the subchannel 505 and a second value of the bit may indicate that the PSSCH 510 of the subchannel 505 is rate-matched around the control region of the subchannel 505. In some specific examples, the first value of the bit may be zero and the second value of the bit may be 1. In such examples, the anchor UE 115 may determine that the values of the bits corresponding to subchannel 505-*b* through subchannel 505-*e* are equal to zero and that the values of the bits corresponding to subchannel 505-*f* through subchannel 505-*i* are equal to one. As such, in some implementations, the anchor UE 115 may transmit the rate-matching indication field to the client UE 115 including a bitfield or bitstream of 00001111. In some other implementations, such as in implementations in which the bitfield length is dependent on the number of subchannels that are assigned an uplink grant 520, the rate-matching indication field may include a bitfield or bitstream of 1111.

The anchor UE 115, based on indicating the rate-matching status of each subchannel 505 individually, may accurately indicate which subchannels 505 include PSSCH 510 that is rate-matched around an uplink grant 520 (e.g., a control-only transmission in a control region of the subchannel 505).

In some other examples, the rate-matching indication field may convey, indicate, or otherwise provide the client UE 115 with a rate-matching status of each group of subchannels 505. In such examples, the rate-matching indication may include a set of bits and each bit of the set of bits may correspond to a group of subchannels 505 (e.g., a group of one or more subchannels 505). The resolution or granularity of how the anchor UE 115 indicates the rate-matching status of the subchannels 505 may be based on a quantity of the set of bits and a quantity of the additional subchannels 505 allocated to the client UE 115. For instance, in examples in which the set of bits includes two bits and the client UE 115 is allocated with two additional subchannels 505, each bit may correspond to one subchannel 505. Alternatively, in examples in which the set of bits includes two bits and the client UE 115 is allocated with ten additional subchannels 505, each bit may correspond to five subchannels 505.

Alternatively, the set of bits may include four bits (e.g., have a 4-bit length) and each bit of the set of bits may correspond to two subchannels 505 of the eight additional subchannels 505 allocated to the client UE 115. In some examples, the rate-matching indication field may include a bitfield or a bitstream of 0011 to indicate that the bottom four subchannels 505 include control-only transmissions (e.g., uplink grants 520) within their respective control regions. In such examples, a bit value of zero may indicate that the subchannels within the group of subchannels 505 corresponding to the bit include PSSCH 510 that is not rate-matched around the control regions of the subchannels 505 and a bit value of one may indicate that the subchannels within the group of subchannels 505 corresponding to the bit include PSSCH 510 that is rate-matched around the control regions of the subchannels 505.

In some implementations, the group of subchannels 505 corresponding to one bit may be randomized. For example, the anchor UE 115 and the client UE 115 may select which subchannels 505 are included in a group of subchannels corresponding to one bit randomly. For instance, in examples in which one bit corresponds to five subchannels 505, the five subchannels 505 may be randomized per slot (within the total number of subchannels 505 allocated to the client UE 115). In some examples, the anchor UE 115 and the client UE 115 may determine which subchannels 505 to include within a group of subchannels based on one or more random seeds. The one or more random seeds may be known to both the anchor UE 115 and the client UE 115 based on a pre-configuration or based on signaling. For example, the anchor UE 115 and the client UE 115 may determine the same random seeds based on an RRC configuration (e.g., based on signaling an RRC message).

In such examples in which the rate-matching indication field indicates the rate-matching status of the subchannels 505 per group of subchannels 505, the anchor UE 115 may achieve a flexible balance between reducing overhead and maintaining accuracy. Further, the anchor UE 115 may control or be configured (e.g., pre-configured) with the resolution or granularity based on configuring or otherwise determining (e.g., identifying based on a pre-configuration) the quantity of the set of bits that may be included within the rate-matching indication field. As such, the anchor UE 115 may have greater control of adjusting or throttling the balance between low overhead and rate-matching accuracy.

In some other examples, the rate-matching indication may convey, indicate, or otherwise provide the client UE 115 with a rate-matching status of all subchannels 505 that are allocated to the client UE 115 as a collective or as a single group. For example, the rate-matching indication field may include a bit that is configured to cover (e.g., indicate a rate-matching status for) all subchannels 505 in the slot that are allocated for a forward link transmission to the client UE 115. In some examples, if at least one subchannel 505 includes a control-only transmission within a control region of the subchannel 505, the anchor UE 115 may determine the value of the bit to indicate to the client UE 115 that the PSSCH 510 allocated to the client UE 115 in each subchannel 505 is rate-matched around the control regions of the subchannels 505. For example, if at least one subchannel 505 includes a control-only transmission, the rate-matching indication field may include a bitfield of 1 that indicates the client UE 115 to rate-match around the control region in each subchannel 505. Alternatively, if no subchannels 505 include a control-only transmission, the rate-matching indication field may include a bitfield of 0 that indicates the client UE 115 to refrain from rate-matching around the control region in each subchannel 505. In such examples in which the anchor UE 115 includes a single bit in the rate-matching indication field to indicate the rate-matching status of the subchannels 505 that are allocated to the client UE 115 as a collective, the anchor UE 115 may reduce the overhead associated with the rate-matching indication field.

FIG. 6 illustrates an example of a rate-matching configuration 600 that supports rate-matching information for a forward link resource grant via SCI in accordance with aspects of the present disclosure. In some examples, the rate-matching configuration 600 may be implemented to realize aspects of the wireless communications system 100 and the wireless communications 200. The rate-matching configuration 600 illustrates a subchannel 605 within a slot 665 that may carry communications between an anchor UE 115 and one or more client UEs 115. In some examples, the anchor UE 115 may allocate the subchannel 605 to a first client UE 115 and may transmit a rate-matching indication field to the first client UE 115 to indicate that the PSSCH 625 allocated for a forward link transmission to the first client UE 115 is rate-matched around a control region 615 used for a control-only transmission, such as a reverse link resource grant or group common SCI, to a second client UE 115.

The rate-matching indication field may indicate to the first client UE 115 that the control region 615 of the subchannel 605 is used for a control-only transmission and that a resource allocation 620 for the first client UE 115 may include the PSSCH 625 that is rate-matched around the control region 615. As such, the subchannel 605 may be referred to as a rate-matching subchannel 605. In some examples, the rate-matching indication field may indicate that a first set of OFDM symbols 610 of the slot 635 in the subchannel 605 are allocated to the control region 615 and that a second set of OFDM symbols 610 of the slot 635 in the subchannel 605 are allocated to the resource allocation 620 for forward link transmission to the first client UE 115. In some implementations, the anchor UE 115 and the first client UE 115 may determine a DMRS pattern for DMRS 630 in the PSSCH 625 within the resource allocation 620 for the first client UE 115.

In some examples, for instance, the anchor UE 115 and the first client UE 115 may determine the DMRS pattern of the rate-matching subchannel 605 based on the number of OFDM symbols 610 that are allocated to the resource allocation 620. For example, the anchor UE 115 and the first client UE 115 may determine that two OFDM symbols 610 include DMRSs 630 in examples in which the number of OFDM symbols 610 included within the second set of OFDM symbols 610 of the resource allocation 620 is less than a threshold number of OFDM symbols 610 (e.g., in examples in which the PSCCH or the PSSCH 625 allocated to the first client UE 115 include less than nine OFDM symbols 610). In some implementations, such as in implementations in which the control region 615 spans four OFDM symbols 610, the upper limit of the number of OFDM symbols 610 included within the resource allocation 620 may be equal to eight OFDM symbols 610 and, as such, the anchor UE 115 and the first client UE 115 may determine that the resource allocation 620 will include two locations for DMRSs 630. For example, the anchor UE 115 and the first client UE 115 may determine that a DMRS 630 is located in the second OFDM symbol 610-*a* of the second set of OFDM symbols 610 and that a DMRS 630 is located in the sixth OFDM symbol 610-*b* of the second set of OFDM symbols 610. In some aspects, the second OFDM symbol 610-*a* of the second set of OFDM symbols 610 may be associated with an OFDM symbol index of 1 (e.g., the OFDM symbol 610-*a* may be referred to as OFDM symbol 1 or OS1) and the sixth OFDM symbol 610-*b* of the second set of OFDM symbols 610 may be associated with an OFDM symbol index of 5 (e.g., the OFDM symbol 610-*b* may be referred to as OFDM symbol 5 or OS5).

FIG. 7 illustrates an example of a process flow 700 that supports rate-matching information for a forward link resource grant via SCI in accordance with aspects of the present disclosure. In some examples, the process flow 700 may implement aspects of the wireless communications system 100 and the wireless communications system 200. The process flow 700 illustrates communications between an anchor UE 115-*d* and a client UE 115-*e*, which may be examples of corresponding devices as described herein. For example, the UE 115-*d* may be an example of an anchor UE 115 and the UE 115-*e* may be an example of a client UE 115 (a first client UE 115). In some examples, the UE 115-*d* may transmit a rate-matching indication field to the UE 115-*e* to indicate a rate-matching status of one or more subchannels that are allocated for a forward link transmission to the UE 115-*e*. Alternative examples of the following may be implemented, where some processes are performed in a different order than described or are not performed at all. In some implementations, processes may include additional features not mentioned below, or further processes may be added.

At 705-*a* and 705-*b*, the UE 115-*d* and the UE 115-*e* may establish a connection with each other. For example, the UE 115-*d* may establish a connection with a second UE (e.g., the UE 115-*e*) and the UE 115-*e* may establish a connection with a first UE (e.g., the UE 115-*d*). In some examples, the connection may include a forward link for communications from the UE 115-*d* to the UE 115-*e* and a reverse link for communications from the UE 115-*e* to the UE 115-*d*.

At 710, the UE 115-*d* may determine a forward link resource grant for the UE 115-*e* including one or more subchannels that are rate-matched around a control region of a control-only transmission to a third UE (e.g., another client UE 115 different than the UE 115-*e*). In some examples, the control-only transmission may be any transmission that occupies a PSCCH region of a subchannel and leaves at least a portion of the PSSCH region of the subchannel unused, such as a reverse link resource grant, an uplink grant, or group common SCI. The control region may refer to the resources of the subchannel that include the control-only transmission and may be pre-configured at the UE 115-*d* and the UE 115-*e*. In some aspects, the control region of a subchannel may include the first four symbols of the subchannel. Additional details relating to the control region of a subchannel are described herein, including with reference to FIGS. 3 and 4.

At 715, the UE 115-*d* may determine a value for each bit included in the rate-matching indication field. In some implementations, the value of the one or more bits in the rate-matching indication field may indicate a rate-matching status of the one or more subchannels that are allocated for a forward link transmission to the UE 115-*e*. In some examples, the rate-matching indication field may include a single bit indicative of the rate-matching status of all of the one or more subchannels allocated for the forward link transmission to the UE 115-*e*. In some other examples, the rate-matching indication field may include a set of bits, each bit of the set of bits indicative of the rate-matching status for a group of subchannels of the one or more subchannels allocated for the forward link transmission to the UE 115-*e*. In some other examples, the rate-matching indication field may include a set of bits, each bit of the set of bits indicative of the rate-matching status of one subchannel of the one or more subchannels allocated for the forward link transmission to the UE 115-*e*. Additional details relating to the rate-matching indication field and determining the values of the bits included in the rate-matching indication field are described herein, including with reference to FIG. 5.

At 720, the UE 115-*d* may transmit, to the UE 115-*e*, the rate-matching indication field in a control information transmission. In some examples, the rate-matching indication field may indicate the rate-matching status of the one or more subchannels of the forward link resource grant around the control region of the control-only transmission to the third UE. The UE 115-*d* may transmit the rate-matching indication field in either SCI-1 or SCI-2.

At 725-*a* and 725-*b*, the UE 115-*d* and the UE 115-*e* may determine a first location for a first DMRS and a second location for a second DMRS. For example, each of the UE 115-*d* and the UE 115-*e* may determine that a first set of symbols of the subchannel are allocated to the control region for the control-only transmission to the third UE and that a second set of symbols of the subchannel after the first set of symbols are allocated to the forward link resource grant for the UE 115-*e*, and may determine locations for DMRSs within the second set of symbols allocated to the forward link resource grant for the UE 115-*e*. In some examples, the UE 115-*d* and the UE 115-*e* may determine that the first DMRS is located in a second OFDM symbol (e.g., OS1) of the second set of symbols and that the second DMRS is located in a sixth OFDM symbol (e.g., OS5) of the second set of symbols. In some aspects, the UE 115-*d* and the UE 115-*e* may determine the locations for the first DMRS and the second DMRS based on a pre-configuration.

At 730, the UE 115-*d* may transmit, to the UE 115-*e*, the forward link transmission over the one or more subchannels based at least in part on the rate-matching status of the one or more subchannels. For example, the UE 115-*d* may transmit the forward link transmission over a portion or region of each subchannel of the one or more subchannels based on whether the subchannel includes a control-only transmission within a control region of the subchannel. Likewise, the UE 115-*e* may receive, from the UE 115-*d*, the forward link transmission over the one or more subchannels.

FIG. 8 shows a block diagram 800 of a device 805 that supports rate-matching information for a forward link resource grant via SCI in accordance with aspects of the present disclosure. The device 805 may be an example of aspects of a UE 115 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to rate-matching information for a forward link resource grant via SCI, etc.). Information may be passed on to other components of the device 805. The receiver 810 may be an example of aspects of the transceiver 1120 described with reference to FIG. 11. The receiver 810 may utilize a single antenna or a set of antennas.

In some examples in which the device 805 functions as an anchor UE, the communications manager 815 may establish a connection with a second UE, the connection including a forward link for communications from the first UE to the second UE and a reverse link for communications from the second UE to the first UE, determine a forward link resource grant for the second UE including one or more subchannels that are rate-matched around a control region of a control-only transmission to a third UE, and transmit, to the second UE, a rate-matching indication field in a control information transmission, where the rate-matching indication field indicates a rate-matching status of the one or more subchannels of the forward link resource grant around the control region of the control-only transmission to the third UE.

In some examples in which the device 805 functions as a client UE, the communications manager 815 may establish a connection with a first UE, the connection including a forward link for communications from the first UE to the second UE and a reverse link for communications from the second UE to the first UE, receive, from the first UE, a rate-matching indication field in a control information transmission, where the rate-matching indication field indicates a rate-matching status of one or more subchannels of a forward link resource grant of the second UE around a control region of a control-only transmission to a third UE, and determine the forward link resource grant for the second UE including the one or more subchannels that are rate-matched around the control region of the control-only transmission to the third UE based on the rate-matching status of the one or more subchannels.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The communications manager 815 may be an example of aspects of the communications manager 1110 described herein.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

In some examples, the communications manager 815 may be implemented as an integrated circuit or chipset for a mobile device modem, and the receiver 810 and the transmitter 820 may be implemented as analog components (e.g., amplifiers, filters, antennas) coupled with the mobile device modem to enable wireless transmission and reception over one or more bands.

The communications manager 815 as described herein may be implemented to realize one or more potential advantages. In some implementations, the communications manager 815, when functioning as a component of an anchor UE, may allocate resources for a forward link transmission to a first client UE 115 within a subchannel carrying a control-only transmission to a second client UE 115. As such, the communications manager may achieve greater resource efficiency by avoiding scenarios in which payload portions of subchannels carrying control-only transmissions are left unused. Further, the communications manager 815 may provide an indication to the first client UE 115 of which of the additional subchannels that are allocated to the first client UE 115 include rate-matched resources via a rate-matching indication field that the communications manager 815 may transmit in either SCI-1 or SCI-2. Based on the implementations described herein, the communications manager 815 may configure the rate-matching indication field to meet a variety of overhead and accuracy conditions.

For example, the communications manager 815, when functioning as a component of an anchor UE, may include a bit in the rate-matching indication field for each additional subchannel allocated to the first client UE 115 to achieve more accurate subchannel rate-matching or may include a single bit in the rate-matching indication field that covers all additional subchannels allocated to the first client UE to reduce the overhead of the rate-matching indication field. Alternatively, the communications manager 815 may achieve a balance between lower overhead and higher accuracy based on including a set of bits in the rate-matching indication field, each bit corresponding to a group of subchannels allocated to the first client UE 115.

Based on improving resource usage and reducing overhead, the communications manager 815 may increase the achievable throughput of the system and, as such, may communicate more data in less time. Accordingly, the communications manager 815, or one or more components of the communications manager 815, may power off more frequently or for longer durations, which may result in improved power savings and longer battery life of the device 805.

FIG. 9 shows a block diagram 900 of a device 905 that supports rate-matching information for a forward link resource grant via SCI in accordance with aspects of the present disclosure. The device 905 may be an example of aspects of a device 805, or a UE 115 as described herein. The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to rate-matching information for a forward link resource grant via SCI, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a connection manager 920, a forward link manager 925, and a rate-matching manager 930. The communications manager 915 may be an example of aspects of the communications manager 1110 described herein.

In some examples of the present disclosure, the device 905 may function as an anchor UE. In such examples, the connection manager 920 may establish a connection with a second UE, the connection including a forward link for communications from the first UE to the second UE and a reverse link for communications from the second UE to the first UE and the forward link manager 925 may determine a forward link resource grant for the second UE including one or more subchannels that are rate-matched around a control region of a control-only transmission to a third UE. The rate-matching manager 930 may transmit, to the second UE, a rate-matching indication field in a control information transmission, where the rate-matching indication field indicates a rate-matching status of the one or more subchannels of the forward link resource grant around the control region of the control-only transmission to the third UE.

In some other examples of the present disclosure, the device 905 may function as a client UE. In such examples, the connection manager 920 may establish a connection with a first UE, the connection including a forward link for communications from the first UE to the second UE and a reverse link for communications from the second UE to the first UE and the rate-matching manager 930 may receive, from the first UE, a rate-matching indication field in a control information transmission, where the rate-matching indication field indicates a rate-matching status of one or more subchannels of a forward link resource grant of the second UE around a control region of a control-only transmission to a third UE. The forward link manager 925 may determine the forward link resource grant for the second UE including the one or more subchannels that are rate-matched around the control region of the control-only transmission to the third UE based on the rate-matching status of the one or more subchannels.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

FIG. 10 shows a block diagram 1000 of a communications manager 1005 that supports rate-matching information for a forward link resource grant via SCI in accordance with aspects of the present disclosure. The communications manager 1005 may be an example of aspects of a communications manager 815, a communications manager 915, or a communications manager 1110 described herein. The communications manager 1005 may include a connection manager 1010, a forward link manager 1015, a rate-matching manager 1020, a mapping manager 1025, a DMRS manager 1030, a SCI manager 1035, and a decoding manager 1040. Each of these modules may communicate, directly or indirectly, with one another (e.g., via one or more buses).

In some examples, the communications manager 1005 may perform functionalities for an anchor UE.

The connection manager 1010 may establish a connection with a second UE, the connection including a forward link for communications from the first UE to the second UE and a reverse link for communications from the second UE to the first UE. In some cases, the first UE is an anchor UE and the second UE is a client UE.

The forward link manager 1015 may determine a forward link resource grant for the second UE including one or more subchannels that are rate-matched around a control region of a control-only transmission to a third UE. In some examples, the forward link manager 1015 may transmit, to the second UE, a forward link transmission over the one or more subchannels based on the rate-matching status of the one or more subchannels. In some cases, the control-only transmission to the third UE includes a resource grant for the third UE or group common SCI.

The rate-matching manager 1020 may transmit, to the second UE, a rate-matching indication field in a control information transmission, where the rate-matching indication field indicates a rate-matching status of the one or more subchannels of the forward link resource grant around the control region of the control-only transmission to the third UE.

In some examples, the rate-matching manager 1020 may determine a value of the bit to indicate whether a resource allocation in all subchannels of the one or more subchannels is rate-matched around the control region of the control-only transmission to the third UE. In some examples, the rate-matching manager 1020 may determine a value of each bit of the set of bits based on which subchannels of the one or more subchannels include a resource allocation that is rate-matched around the control region of the control-only transmission to the third UE. In some examples, the rate-matching manager 1020 may determine a value of each bit of the set of bits based on which groups of subchannels include a resource allocation that is rate-matched around the control region of the control-only transmission to the third UE.

In some examples, the rate-matching manager 1020 may determine that a first set of symbols of a subchannel are allocated to the control region of the control-only transmission to the third UE. In some examples, the rate-matching manager 1020 may determine that a second set of symbols of the subchannel after the first set of symbols are allocated to the forward link resource grant for the second UE.

In some examples, the mapping manager 1025 may determine a mapping between each bit of the set of bits and each group of subchannels of the one or more subchannels based on a random seed.

The DMRS manager 1030 may determine a first location for a first demodulation reference signal associated with the forward link resource grant for the second UE in a second symbol of the second set of symbols. In some examples, the DMRS manager 1030 may determine a second location for a second demodulation reference signal associated with the forward link resource grant for the second UE in a sixth symbol of the second set of symbols.

The SCI manager 1035 may manage sidelink communications by transmitting or receiving SCI. In some cases, the control information transmission includes a first stage SCI transmission. In some cases, the control information transmission includes a second stage SCI transmission.

In some other examples, the communications manager 1005 may perform functionalities for a client UE.

In some examples, the connection manager 1010 may establish a connection with a first UE, the connection including a forward link for communications from the first UE to the second UE and a reverse link for communications from the second UE to the first UE. In some cases, the first UE is an anchor UE and the second UE is a client UE.

In some examples, the forward link manager 1015 may determine the forward link resource grant for the second UE including the one or more subchannels that are rate-matched around the control region of the control-only transmission to the third UE based on the rate-matching status of the one or more subchannels. In some examples, the forward link manager 1015 may receive, from the first UE, a forward link transmission over the one or more subchannels. In some cases, the control-only transmission to the third UE includes a resource grant for the third UE or group common SCI.

In some examples, the rate-matching manager 1020 may receive, from the first UE, a rate-matching indication field in a control information transmission, where the rate-matching indication field indicates a rate-matching status of one or more subchannels of a forward link resource grant of the second UE around a control region of a control-only transmission to a third UE.

In some examples, the rate-matching manager 1020 may determine whether all subchannels of the one or more subchannels include a resource allocation that is rate-matched around the control region of the control-only transmission to the third UE based on a value of the bit. In some examples, the rate-matching manager 1020 may determine which subchannels of the one or more subchannels include a resource allocation that is rate-matched around the control region of the control-only transmission to the third UE based on a value of each bit of the set of bits. In some examples, the rate-matching manager 1020 may determine which groups of subchannels include a resource allocation that is rate-matched around the control region of the control-only transmission to the third UE based on a value of each bit of the set of bits.

In some examples, the rate-matching manager 1020 may determine that a first set of symbols of a subchannel are allocated to the control region of the control-only transmission to the third UE. In some examples, the rate-matching manager 1020 may determine that a second set of symbols of the subchannel after the first set of symbols are allocated to the forward link resource grant for the second UE.

The mapping manager 1025 may determine a mapping between each bit of the set of bits and each group of subchannels of the one or more subchannels based on a random seed.

In some examples, the DMRS manager 1030 may determine a first location for a first demodulation reference signal associated with the forward link resource grant for the second UE in a second symbol of the second set of symbols. In some examples, the DMRS manager 1030 may determine a second location for a second demodulation reference signal associated with the forward link resource grant for the second UE in a sixth symbol of the second set of symbols.

The SCI manager 1035 may manage sidelink communications by transmitting or receiving SCI. In some cases, the control information transmission includes a first stage SCI transmission. In some cases, the control information transmission includes a second stage SCI transmission.

The decoding manager 1040 may decode the forward link transmission based on the rate-matching status of the one or more subchannels.

FIG. 11 shows a diagram of a system 1100 including a device 1105 that supports rate-matching information for a forward link resource grant via SCI in accordance with aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

In some examples, the device 1105 may function as an anchor UE. In such examples, the communications manager 1110 may establish a connection with a second UE, the connection including a forward link for communications from the first UE to the second UE and a reverse link for communications from the second UE to the first UE, determine a forward link resource grant for the second UE including one or more subchannels that are rate-matched around a control region of a control-only transmission to a third UE, and transmit, to the second UE, a rate-matching indication field in a control information transmission, where the rate-matching indication field indicates a rate-matching status of the one or more subchannels of the forward link resource grant around the control region of the control-only transmission to the third UE.

In some other examples, the device 1105 may function as a client UE. In such examples, the communications manager 1110 may also establish a connection with a first UE, the connection including a forward link for communications from the first UE to the second UE and a reverse link for communications from the second UE to the first UE, receive, from the first LIE, a rate-matching indication field in a control information transmission, where the rate-matching indication field indicates a rate-matching status of one or more subchannels of a forward link resource grant of the second UE around a control region of a control-only transmission to a third UE, and determine the forward link resource grant for the second UE including the one or more subchannels that are rate-matched around the control region of the control-only transmission to the third UE based on the rate-matching status of the one or more subchannels.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include random-access memory (RAM) and read-only memory (ROM). The memory 1130 may store computer-readable, computer-executable code 1135 including instructions that, when executed, cause the processor to perform various functions described herein. In some cases, the memory 1130 may contain, among other things, a basic I/O system (BIOS) which may control basic hardware or software operation such as the interaction with peripheral components or devices.

The processor 1140 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting rate-matching information for a forward link resource grant via SCI).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

FIG. 12 shows a flowchart illustrating a method 1200 that supports rate-matching information for a forward link resource grant via SCI in accordance with aspects of the present disclosure. The operations of method 1200 may be implemented by a UE 115 or its components as described herein. For example, the operations of method 1200 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1205, the UE may establish a connection with a second UE, the connection including a forward link for communications from the first UE to the second UE and a reverse link for communications from the second UE to the first UE. The operations of 1205 may be performed according to the methods described herein. In some examples, aspects of the operations of 1205 may be performed by a connection manager as described with reference to FIGS. 8 through 11.

At 1210, the UE may determine a forward link resource grant for the second UE including one or more subchannels that are rate-matched around a control region of a control-only transmission to a third UE. The operations of 1210 may be performed according to the methods described herein. In some examples, aspects of the operations of 1210 may be performed by a forward link manager as described with reference to FIGS. 8 through 11.

At 1215, the UE may transmit, to the second UE, a rate-matching indication field in a control information transmission, where the rate-matching indication field indicates a rate-matching status of the one or more subchannels of the forward link resource grant around the control region of the control-only transmission to the third UE. The operations of 1215 may be performed according to the methods described herein. In some examples, aspects of the operations of 1215 may be performed by a rate-matching manager as described with reference to FIGS. 8 through 11.

FIG. 13 shows a flowchart illustrating a method 1300 that supports rate-matching information for a forward link resource grant via SCI in accordance with aspects of the present disclosure. The operations of method 1300 may be implemented by a UE 115 or its components as described herein. For example, the operations of method 1300 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1305, the UE may establish a connection with a second UE, the connection including a forward link for communications from the first UE to the second UE and a reverse link for communications from the second UE to the first UE. The operations of 1305 may be performed according to the methods described herein. In some examples, aspects of the operations of 1305 may be performed by a connection manager as described with reference to FIGS. 8 through 11.

At 1310, the UE may determine a forward link resource grant for the second UE including one or more subchannels that are rate-matched around a control region of a control-only transmission to a third UE. The operations of 1310 may be performed according to the methods described herein. In some examples, aspects of the operations of 1310 may be performed by a forward link manager as described with reference to FIGS. 8 through 11.

At 1315, the UE may determine a value of a bit to indicate whether a resource allocation in all subchannels of the one or more subchannels is rate-matched around the control region of the control-only transmission to the third UE. The operations of 1315 may be performed according to the methods described herein. In some examples, aspects of the operations of 1315 may be performed by a rate-matching manager as described with reference to FIGS. 8 through 11.

At 1320, the UE may transmit, to the second UE, a rate-matching indication field in a control information transmission, where the rate-matching indication field indicates a rate-matching status of the one or more subchannels of the forward link resource grant around the control region of the control-only transmission to the third UE. The operations of 1320 may be performed according to the methods described herein. In some examples, aspects of the operations of 1320 may be performed by a rate-matching manager as described with reference to FIGS. 8 through 11.

FIG. 14 shows a flowchart illustrating a method 1400 that supports rate-matching information for a forward link resource grant via SCI in accordance with aspects of the present disclosure. The operations of method 1400 may be implemented by a UE 115 or its components as described herein. For example, the operations of method 1400 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1405, the UE may establish a connection with a second UE, the connection including a forward link for communications from the first UE to the second UE and a reverse link for communications from the second UE to the first UE. The operations of 1405 may be performed according to the methods described herein. In some examples, aspects of the operations of 1405 may be performed by a connection manager as described with reference to FIGS. 8 through 11.

At 1410, the UE may determine a forward link resource grant for the second UE including one or more subchannels that are rate-matched around a control region of a control-only transmission to a third UE. The operations of 1410 may be performed according to the methods described herein. In some examples, aspects of the operations of 1410 may be performed by a forward link manager as described with reference to FIGS. 8 through 11.

At 1415, the UE may determine a value of each bit of a set of bits based on which subchannels of the one or more subchannels include a resource allocation that is rate-matched around the control region of the control-only transmission to the third UE. The operations of 1415 may be performed according to the methods described herein. In some examples, aspects of the operations of 1415 may be performed by a rate-matching manager as described with reference to FIGS. 8 through 11.

At 1420, the UE may transmit, to the second UE, a rate-matching indication field in a control information transmission, where the rate-matching indication field indicates a rate-matching status of the one or more subchannels of the forward link resource grant around the control region of the control-only transmission to the third UE. The operations of 1420 may be performed according to the methods described herein. In some examples, aspects of the operations of 1420 may be performed by a rate-matching manager as described with reference to FIGS. 8 through 11.

FIG. 15 shows a flowchart illustrating a method 1500 that supports rate-matching information for a forward link resource grant via SCI in accordance with aspects of the present disclosure. The operations of method 1500 may be implemented by a UE 115 or its components as described herein. For example, the operations of method 1500 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1505, the UE may establish a connection with a second UE, the connection including a forward link for communications from the first UE to the second UE and a reverse link for communications from the second UE to the first UE. The operations of 1505 may be performed according to the methods described herein. In some examples, aspects of the operations of 1505 may be performed by a connection manager as described with reference to FIGS. 8 through 11.

At 1510, the UE may determine a forward link resource grant for the second UE including one or more subchannels that are rate-matched around a control region of a control-only transmission to a third UE. The operations of 1510 may be performed according to the methods described herein. In some examples, aspects of the operations of 1510 may be performed by a forward link manager as described with reference to FIGS. 8 through 11.

At 1515, the UE may determine a value of each bit of a set of bits based on which groups of subchannels include a resource allocation that is rate-matched around the control region of the control-only transmission to the third UE. The operations of 1515 may be performed according to the methods described herein. In some examples, aspects of the operations of 1515 may be performed by a rate-matching manager as described with reference to FIGS. 8 through 11.

At 1520, the UE may transmit, to the second UE, a rate-matching indication field in a control information transmission, where the rate-matching indication field indicates a rate-matching status of the one or more subchannels of the forward link resource grant around the control region of the control-only transmission to the third UE. The operations of 1520 may be performed according to the methods described herein. In some examples, aspects of the operations of 1520 may be performed by a rate-matching manager as described with reference to FIGS. 8 through 11.

FIG. 16 shows a flowchart illustrating a method 1600 that supports rate-matching information for a forward link resource grant via SCI in accordance with aspects of the present disclosure. The operations of method 1600 may be implemented by a UE 115 or its components as described herein. For example, the operations of method 1600 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1605, the UE may establish a connection with a second UE, the connection including a forward link for communications from the first UE to the second UE and a reverse link for communications from the second UE to the first UE. The operations of 1605 may be performed according to the methods described herein. In some examples, aspects of the operations of 1605 may be performed by a connection manager as described with reference to FIGS. 8 through 11.

At 1610, the UE may determine a forward link resource grant for the second UE including one or more subchannels that are rate-matched around a control region of a control-only transmission to a third UE. The operations of 1610 may be performed according to the methods described herein. In some examples, aspects of the operations of 1610 may be performed by a forward link manager as described with reference to FIGS. 8 through 11.

At 1615, the UE may transmit, to the second UE, a rate-matching indication field in a control information transmission, where the rate-matching indication field indicates a rate-matching status of the one or more subchannels of the forward link resource grant around the control region of the control-only transmission to the third UE. The operations of 1615 may be performed according to the methods described herein. In some examples, aspects of the operations of 1615 may be performed by a rate-matching manager as described with reference to FIGS. 8 through 11.

At 1620, the UE may transmit, to the second UE, a forward link transmission over the one or more subchannels based on the rate-matching status of the one or more subchannels. The operations of 1620 may be performed according to the methods described herein. In some examples, aspects of the operations of 1620 may be performed by a forward link manager as described with reference to FIGS. 8 through 11.

FIG. 17 shows a flowchart illustrating a method 1700 that supports rate-matching information for a forward link resource grant via SCI in accordance with aspects of the present disclosure. The operations of method 1700 may be implemented by a UE 115 or its components as described herein. For example, the operations of method 1700 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1705, the UE may establish a connection with a first UE, the connection including a forward link for communications from the first UE to the second UE and a reverse link for communications from the second UE to the first UE. The operations of 1705 may be performed according to the methods described herein. In some examples, aspects of the operations of 1705 may be performed by a connection manager as described with reference to FIGS. 8 through 11.

At 1710, the UE may receive, from the first UE, a rate-matching indication field in a control information transmission, where the rate-matching indication field indicates a rate-matching status of one or more subchannels of a forward link resource grant of the second UE around a control region of a control-only transmission to a third UE. The operations of 1710 may be performed according to the methods described herein. In some examples, aspects of the operations of 1710 may be performed by a rate-matching manager as described with reference to FIGS. 8 through 11.

At 1715, the UE may determine the forward link resource grant for the second UE including the one or more subchannels that are rate-matched around the control region of the control-only transmission to the third UE based on the rate-matching status of the one or more subchannels. The operations of 1715 may be performed according to the methods described herein. In some examples, aspects of the operations of 1715 may be performed by a forward link manager as described with reference to FIGS. 8 through 11.

FIG. 18 shows a flowchart illustrating a method 1800 that supports rate-matching information for a forward link resource grant via SCI in accordance with aspects of the present disclosure. The operations of method 1800 may be implemented by a UE 115 or its components as described herein. For example, the operations of method 1800 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1805, the UE may establish a connection with a first UE, the connection including a forward link for communications from the first UE to the second UE and a reverse link for communications from the second UE to the first UE. The operations of 1805 may be performed according to the methods described herein. In some examples, aspects of the operations of 1805 may be performed by a connection manager as described with reference to FIGS. 8 through 11.

At 1810, the UE may receive, from the first UE, a rate-matching indication field in a control information transmission, where the rate-matching indication field indicates a rate-matching status of one or more subchannels of a forward link resource grant of the second UE around a control region of a control-only transmission to a third UE. The operations of 1810 may be performed according to the methods described herein. In some examples, aspects of the operations of 1810 may be performed by a rate-matching manager as described with reference to FIGS. 8 through 11.

At 1815, the UE may determine the forward link resource grant for the second UE including the one or more subchannels that are rate-matched around the control region of the control-only transmission to the third UE based on the rate-matching status of the one or more subchannels. The operations of 1815 may be performed according to the methods described herein. In some examples, aspects of the operations of 1815 may be performed by a forward link manager as described with reference to FIGS. 8 through 11.

At 1820, the UE may receive, from the first UE, a forward link transmission over the one or more subchannels. The operations of 1820 may be performed according to the methods described herein. In some examples, aspects of the operations of 1820 may be performed by a forward link manager as described with reference to FIGS. 8 through 11.

At 1825, the UE may decode the forward link transmission based on the rate-matching status of the one or more subchannels. The operations of 1825 may be performed according to the methods described herein. In some examples, aspects of the operations of 1825 may be performed by a decoding manager as described with reference to FIGS. 8 through 11.

FIG. 19 shows a flowchart illustrating a method 1900 that supports rate-matching information for a forward link resource grant via SCI in accordance with aspects of the present disclosure. The operations of method 1900 may be implemented by a UE 115 or its components as described herein. For example, the operations of method 1900 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1905, the UE may establish a connection with a first UE, the connection including a forward link for communications from the first UE to the second UE and a reverse link for communications from the second UE to the first UE. The operations of 1905 may be performed according to the methods described herein. In some examples, aspects of the operations of 1905 may be performed by a connection manager as described with reference to FIGS. 8 through 11.

At 1910, the UE may receive, from the first UE, a rate-matching indication field in a control information transmission, where the rate-matching indication field indicates a rate-matching status of one or more subchannels of a forward link resource grant of the second UE around a control region of a control-only transmission to a third UE. The operations of 1910 may be performed according to the methods described herein. In some examples, aspects of the operations of 1910 may be performed by a rate-matching manager as described with reference to FIGS. 8 through 11.

At 1915, the UE may determine whether all subchannels of the one or more subchannels include a resource allocation that is rate-matched around the control region of the control-only transmission to the third UE based on a value of a bit. The operations of 1915 may be performed according to the methods described herein. In some examples, aspects of the operations of 1915 may be performed by a rate-matching manager as described with reference to FIGS. 8 through 11.

At 1920, the UE may determine the forward link resource grant for the second UE including the one or more subchannels that are rate-matched around the control region of the control-only transmission to the third UE based on the rate-matching status of the one or more subchannels. The operations of 1920 may be performed according to the methods described herein. In some examples, aspects of the operations of 1920 may be performed by a forward link manager as described with reference to FIGS. 8 through 11.

FIG. 20 shows a flowchart illustrating a method 2000 that supports rate-matching information for a forward link resource grant via SCI in accordance with aspects of the present disclosure. The operations of method 2000 may be implemented by a UE 115 or its components as described herein. For example, the operations of method 2000 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 2005, the UE may establish a connection with a first UE, the connection including a forward link for communications from the first UE to the second UE and a reverse link for communications from the second UE to the first UE. The operations of 2005 may be performed according to the methods described herein. In some examples, aspects of the operations of 2005 may be performed by a connection manager as described with reference to FIGS. 8 through 11.

At 2010, the UE may receive, from the first UE, a rate-matching indication field in a control information transmission, where the rate-matching indication field indicates a rate-matching status of one or more subchannels of a forward link resource grant of the second UE around a control region of a control-only transmission to a third UE. The operations of 2010 may be performed according to the methods described herein. In some examples, aspects of the operations of 2010 may be performed by a rate-matching manager as described with reference to FIGS. 8 through 11.

At 2015, the UE may determine which subchannels of the one or more subchannels include a resource allocation that is rate-matched around the control region of the control-only transmission to the third UE based on a value of each bit of a set of bits. The operations of 2015 may be performed according to the methods described herein. In some examples, aspects of the operations of 2015 may be performed by a rate-matching manager as described with reference to FIGS. 8 through 11.

At 2020, the UE may determine the forward link resource grant for the second UE including the one or more subchannels that are rate-matched around the control region of the control-only transmission to the third UE based on the rate-matching status of the one or more subchannels. The operations of 2020 may be performed according to the methods described herein. In some examples, aspects of the operations of 2020 may be performed by a forward link manager as described with reference to FIGS. 8 through 11.

FIG. 21 shows a flowchart illustrating a method 2100 that supports rate-matching information for a forward link resource grant via SCI in accordance with aspects of the present disclosure. The operations of method 2100 may be implemented by a UE 115 or its components as described herein. For example, the operations of method 2100 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 2105, the UE may establish a connection with a first UE, the connection including a forward link for communications from the first UE to the second UE and a reverse link for communications from the second UE to the first UE. The operations of 2105 may be performed according to the methods described herein. In some examples, aspects of the operations of 2105 may be performed by a connection manager as described with reference to FIGS. 8 through 11.

At 2110, the UE may receive, from the first UE, a rate-matching indication field in a control information transmission, where the rate-matching indication field indicates a rate-matching status of one or more subchannels of a forward link resource grant of the second UE around a control region of a control-only transmission to a third UE. The operations of 2110 may be performed according to the methods described herein. In some examples, aspects of the operations of 2110 may be performed by a rate-matching manager as described with reference to FIGS. 8 through 11.

At 2115, the UE may determine which groups of subchannels include a resource allocation that is rate-matched around the control region of the control-only transmission to the third UE based on a value of each bit of a set of bits. The operations of 2115 may be performed according to the methods described herein. In some examples, aspects of the operations of 2115 may be performed by a rate-matching manager as described with reference to FIGS. 8 through 11.

At 2120, the UE may determine the forward link resource grant for the second UE including the one or more subchannels that are rate-matched around the control region of the control-only transmission to the third UE based on the rate-matching status of the one or more subchannels. The operations of 2120 may be performed according to the methods described herein. In some examples, aspects of the operations of 2120 may be performed by a forward link manager as described with reference to FIGS. 8 through 11.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a first user equipment (UE), comprising:
establishing a connection with a second UE, the connection comprising a forward link for communications from the first UE to the second UE and a reverse link for communications from the second UE to the first UE;
determining a forward link resource grant for the second UE comprising one or more subchannels that are rate-matched around a control region of a control-only transmission to a third UE; and
transmitting, to the second UE, a rate-matching indication field in a control information transmission, wherein the rate-matching indication field indicates a rate-matching status of the one or more subchannels of the forward link resource grant around the control region of the control-only transmission to the third UE.

2. The method of claim 1, wherein the rate-matching indication field comprises a bit indicating the rate-matching status of the one or more subchannels, the method further comprising:
determining a value of the bit to indicate whether a resource allocation in all subchannels of the one or more subchannels is rate-matched around the control region of the control-only transmission to the third UE.

3. The method of claim 1, wherein the rate-matching indication field comprises a set of bits, each bit of the set of bits indicating the rate-matching status of a subchannel of the one or more subchannels, the method further comprising:

determining a value of each bit of the set of bits based at least in part on which subchannels of the one or more subchannels include a resource allocation that is rate-matched around the control region of the control-only transmission to the third UE.

4. The method of claim 1, wherein the rate-matching indication field comprises a set of bits, each bit of the set of bits indicating the rate-matching status of a group of sub-channels of the one or more subchannels, the method further comprising:

determining a value of each bit of the set of bits based at least in part on which groups of subchannels include a resource allocation that is rate-matched around the control region of the control-only transmission to the third UE.

5. The method of claim 1, wherein determining the forward link resource grant for the second UE comprising the one or more subchannels that are rate-matched around the control region of the control-only transmission to the third UE comprises:

determining that a first set of symbols of a subchannel are allocated to the control region of the control-only transmission to the third UE; and determining that a second set of symbols of the subchannel after the first set of symbols are allocated to the forward link resource grant for the second UE.

6. A method for wireless communications at a second user equipment (UE), comprising:

establishing a connection with a first UE, the connection comprising a forward link for communications from the first UE to the second UE and a reverse link for communications from the second UE to the first UE;

receiving, from the first UE, a rate-matching indication field in a control information transmission, wherein the rate-matching indication field indicates a rate-matching status of one or more subchannels of a forward link resource grant of the second UE around a control region of a control-only transmission to a third UE; and determining the forward link resource grant for the second UE comprising the one or more subchannels that are rate-matched around the control region of the control-only transmission to the third UE based at least in part on the rate-matching status of the one or more subchannels.

7. The method of claim 6, further comprising:

receiving, from the first UE, a forward link transmission over the one or more subchannels; and decoding the forward link transmission based at least in part on the rate-matching status of the one or more subchannels.

8. The method of claim 6, wherein the rate-matching indication field comprises a bit indicating the rate-matching status of the one or more subchannels, the method further comprising:

determining whether all subchannels of the one or more subchannels include a resource allocation that is rate-matched around the control region of the control-only transmission to the third UE based at least in part on a value of the bit.

9. The method of claim 6, wherein the rate-matching indication field comprises a set of bits, each bit of the set of bits indicating the rate-matching status of a subchannel of the one or more subchannels, the method further comprising:

determining which subchannels of the one or more sub-channels include a resource allocation that is rate-matched around the control region of the control-only transmission to the third UE based at least in part on a value of each bit of the set of bits.

10. The method of claim 6, wherein the rate-matching indication field comprises a set of bits, each bit of the set of bits indicating the rate-matching status of a group of sub-channels of the one or more subchannels, the method further comprising:

determining which groups of subchannels include a resource allocation that is rate-matched around the control region of the control-only transmission to the third UE based at least in part on a value of each bit of the set of bits.

11. An apparatus for wireless communications at a first user equipment (UE), comprising:

a processor, memory coupled with the processor; and instructions stored in the memory and executable by the processor to cause the apparatus to:

establish a connection with a second UE, the connection comprising a forward link for communications from the first UE to the second UE and a reverse link for communications from the second UE to the first UE;

determine a forward link resource grant for the second UE comprising one or more subchannels that are rate-matched around a control region of a control-only transmission to a third UE; and transmit, to the second UE, a rate-matching indication field in a control information transmission, wherein the rate-matching indication field indicates a rate-matching status of the one or more subchannels of the forward link resource grant around the control region of the control-only transmission to the third UE.

12. The apparatus of claim 11, wherein the rate-matching indication field comprises a bit indicating the rate-matching status of the one or more subchannels, and the instructions are further executable by the processor to cause the apparatus to:

determine a value of the bit to indicate whether a resource allocation in all subchannels of the one or more sub-channels is rate-matched around the control region of the control-only transmission to the third UE.

13. The apparatus of claim 11, wherein the rate-matching indication field comprises a set of bits, and the instructions are further executable by the processor to cause the apparatus to:

determine a value of each bit of the set of bits based at least in part on which subchannels of the one or more subchannels include a resource allocation that is rate-matched around the control region of the control-only transmission to the third UE.

14. The apparatus of claim 11, wherein the rate-matching indication field comprises a set of bits, and the instructions are further executable by the processor to cause the apparatus to:

determine a value of each bit of the set of bits based at least in part on which groups of subchannels include a resource allocation that is rate-matched around the control region of the control-only transmission to the third UE.

15. The apparatus of claim 14, wherein the instructions are further executable by the processor to cause the apparatus to:

determine a mapping between each bit of the set of bits and each group of subchannels of the one or more subchannels based at least in part on a random seed.

16. The apparatus of claim 11, wherein the instructions to determine the forward link resource grant for the second UE comprising the one or more subchannels that are rate-matched around the control region of the control-only transmission to the third UE are further executable by the processor to cause the apparatus to:

determine that a first set of symbols of a subchannel are allocated to the control region of the control-only transmission to the third UE; and determine that a second set of symbols of the subchannel after the first set of symbols are allocated to the forward link resource grant for the second UE.

17. The apparatus of claim 16, wherein the instructions are further executable by the processor to cause the apparatus to:

determine a first location for a first demodulation reference signal associated with the forward link resource grant for the second UE in a second symbol of the second set of symbols; and determine a second location for a second demodulation reference signal associated with the forward link resource grant for the second UE in a sixth symbol of the second set of symbols.

18. The apparatus of claim 11, wherein the instructions are further executable by the processor to cause the apparatus to:

transmit, to the second UE, a forward link transmission over the one or more subchannels based at least in part on the rate-matching status of the one or more subchannels.

19. The apparatus of claim 11, wherein the control information transmission comprises a first stage sidelink control information transmission.

20. The apparatus of claim 11, wherein the control information transmission comprises a second stage sidelink control information transmission.

21. The apparatus of claim 11, wherein the control-only transmission to the third UE comprises a resource grant for the third UE or group common sidelink control information.

22. The apparatus of claim 11, wherein the first UE is an anchor UE and the second UE is a client UE.

23. An apparatus for wireless communications at a second user equipment (UE), comprising:

a processor, memory coupled with the processor; and instructions stored in the memory and executable by the processor to cause the apparatus to:

establish a connection with a first UE, the connection comprising a forward link for communications from the first UE to the second UE and a reverse link for communications from the second UE to the first UE;

receive, from the first UE, a rate-matching indication field in a control information transmission, wherein the rate-matching indication field indicates a rate-matching status of one or more subchannels of a forward link resource grant of the second UE around a control region of a control-only transmission to a third UE; and determine the forward link resource grant for the second UE comprising the one or more subchannels that are rate-matched around the control region of the control-only transmission to the third UE based at least in part on the rate-matching status of the one or more subchannels.

24. The apparatus of claim 23, wherein the instructions are further executable by the processor to cause the apparatus to:

receive, from the first UE, a forward link transmission over the one or more subchannels; and decode the forward link transmission based at least in part on the rate-matching status of the one or more subchannels.

25. The apparatus of claim 23, wherein the rate-matching indication field comprises a bit indicating the rate-matching status of the one or more subchannels, and the instructions are further executable by the processor to cause the apparatus to:

determine whether all subchannels of the one or more subchannels include a resource allocation that is rate-matched around the control region of the control-only transmission to the third UE based at least in part on a value of the bit.

26. The apparatus of claim 23, wherein the rate-matching indication field comprises a set of bits, and the instructions are further executable by the processor to cause the apparatus to:

determine which subchannels of the one or more subchannels include a resource allocation that is rate-matched around the control region of the control-only transmission to the third UE based at least in part on a value of each bit of the set of bits.

27. The apparatus of claim 23, wherein the rate-matching indication field comprises a set of bits, and the instructions are further executable by the processor to cause the apparatus to:

determine which groups of subchannels include a resource allocation that is rate-matched around the control region of the control-only transmission to the third UE based at least in part on a value of each bit of the set of bits.

28. The apparatus of claim 27, wherein the instructions are further executable by the processor to cause the apparatus to:

determine a mapping between each bit of the set of bits and each group of subchannels of the one or more subchannels based at least in part on a random seed.

29. The apparatus of claim 23, wherein the instructions to determine the forward link resource grant for the second UE comprising the one or more subchannels that are rate-matched around the control region of the control-only transmission to the third UE are further executable by the processor to cause the apparatus to:

determine that a first set of symbols of a subchannel are allocated to the control region of the control-only transmission to the third UE; and determine that a second set of symbols of the subchannel after the first set of symbols are allocated to the forward link resource grant for the second UE.

30. The apparatus of claim 29, wherein the instructions are further executable by the processor to cause the apparatus to:

determine a first location for a first demodulation reference signal associated with the forward link resource grant for the second UE in a second symbol of the second set of symbols; and determine a second location for a second demodulation reference signal associated with the forward link resource grant for the second UE in a sixth symbol of the second set of symbols.

31. The apparatus of claim 23, wherein the control information transmission comprises a first stage sidelink control information transmission.

32. The apparatus of claim 23, wherein the control information transmission comprises a second stage sidelink control information transmission.

33. The apparatus of claim 23, wherein the control-only transmission to the third UE comprises a resource grant for the third UE or group common sidelink control information.

34. The apparatus of claim 23, wherein the first UE is an anchor UE and the second UE is a client UE.

35. An apparatus for wireless communications at a first user equipment (UE), comprising:

means for establishing a connection with a second UE, the connection comprising a forward link for communications from the first UE to the second UE and a reverse link for communications from the second UE to the first UE;

means for determining a forward link resource grant for the second UE comprising one or more subchannels that are rate-matched around a control region of a control-only transmission to a third UE; and means for transmitting, to the second UE, a rate-matching indication field in a control information transmission, wherein the rate-matching indication field indicates a rate-matching status of the one or more subchannels of the forward link resource grant around the control region of the control-only transmission to the third UE.

* * * * *